(12) United States Patent
Liang et al.

(10) Patent No.: US 11,747,640 B2
(45) Date of Patent: Sep. 5, 2023

(54) OPTICAL MODULE, NEAR-EYE DISPLAY DEVICE AND LIGHT PROJECTION METHOD

(71) Applicant: Shanghai UROptics Co. Ltd., Shanghai (CN)

(72) Inventors: Qianyi Liang, Shanghai (CN); Hao Wu, Shanghai (CN); Xingpeng Yang, Shanghai (CN)

(73) Assignee: Shanghai UROptics Co. Ltd., Shanghai (CN)

(*) Notice: Subject to any disclaimer, the term of this patent is extended or adjusted under 35 U.S.C. 154(b) by 233 days.

(21) Appl. No.: 17/461,119

(22) Filed: Aug. 30, 2021

(65) Prior Publication Data
US 2022/0099988 A1 Mar. 31, 2022

(30) Foreign Application Priority Data

Sep. 30, 2020 (CN) .......................... 202011061771.3
Sep. 30, 2020 (CN) .......................... 202022206054.7
(Continued)

(51) Int. Cl.
*G02B 27/28* (2006.01)
*G02B 27/01* (2006.01)
(Continued)

(52) U.S. Cl.
CPC .......... *G02B 27/283* (2013.01); *G02B 26/06* (2013.01); *G02B 27/0172* (2013.01); *H04N 9/3152* (2013.01); *H04N 9/3167* (2013.01)

(58) Field of Classification Search
CPC .. G02B 27/283; G02B 27/172; H04N 9/3152; H04N 9/3167
(Continued)

(56) References Cited

U.S. PATENT DOCUMENTS

| 6,400,493 B1 | 6/2002 | Mertz et al. |
| 2011/0025965 A1 | 2/2011 | Yamaguchi |
| 2020/0284963 A1 | 9/2020 | Yun et al. |

FOREIGN PATENT DOCUMENTS

| CN | 109946837 A | 6/2019 |
| CN | 209356760 U | 9/2019 |

(Continued)

OTHER PUBLICATIONS

English Translation of International Search Report of PCT/CN2021/128391, dated Feb. 8, 2022, 3 pages.

*Primary Examiner* — Jerry L Brooks
(74) *Attorney, Agent, or Firm* — Meunier Carlin & Curfman LLC

(57) ABSTRACT

An optical module comprising: a partial-transmitting and partial-reflective layer, receiving circularly polarized light or elliptically polarized light; a second phase delay unit, located downstream of an optical path of the partial-transmitting and partial-reflective layer so as to receive and modulate the transmitting circularly polarized light or elliptically polarized light and then perform emission; and a polarized beam splitter, disposed downstream of an optical path of the second phase delay unit, the polarized beam splitter having a light transmission axis, wherein the optical module further comprises a second phase compensation unit located between the second phase delay unit and the polarized beam splitter, and wherein an optical axis of the second phase compensation unit is located in a plane orthogonal to the light transmission axis of the polarized beam splitter, or in a plane orthogonal to a light reflection axis of the polarized beam splitter.

20 Claims, 12 Drawing Sheets

(30) Foreign Application Priority Data

Nov. 3, 2020 (CN) .......................... 202011210641.1
Nov. 3, 2020 (CN) .......................... 202022504347.3
Jun. 8, 2021 (CN) .......................... 202121273674.0

(51) Int. Cl.
*G02B 26/06* (2006.01)
*H04N 9/31* (2006.01)

(58) Field of Classification Search
USPC ......................................................... 353/630
See application file for complete search history.

(56) References Cited

FOREIGN PATENT DOCUMENTS

| | | | |
|---|---|---|---|
| CN | 110716314 A | | 1/2020 |
| CN | 112379519 A | | 2/2021 |
| CN | 112526754 A | | 3/2021 |
| CN | 113485012 A | * | 10/2021 |
| CN | 113485012 A | | 10/2021 |

* cited by examiner

- M: the light passes the absorbent polarizer for the first time
- N: the light passes the first phase delay unit
- O: the light passes the second phase delay unit for the first time
- U: the light passes B1 of the second phase compensation unit
- V: the light passes B2 of the second phase compensation unit
- P: the light passes the PBS

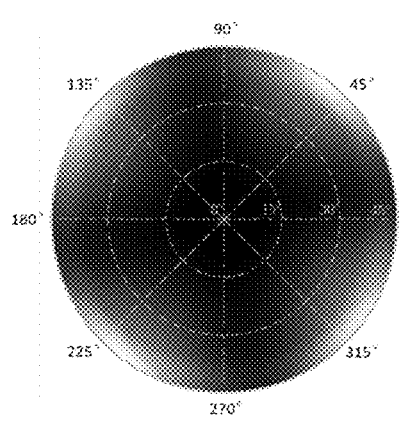
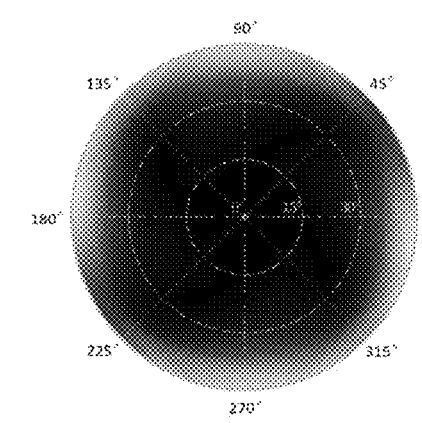
Fig.14AFig.14B
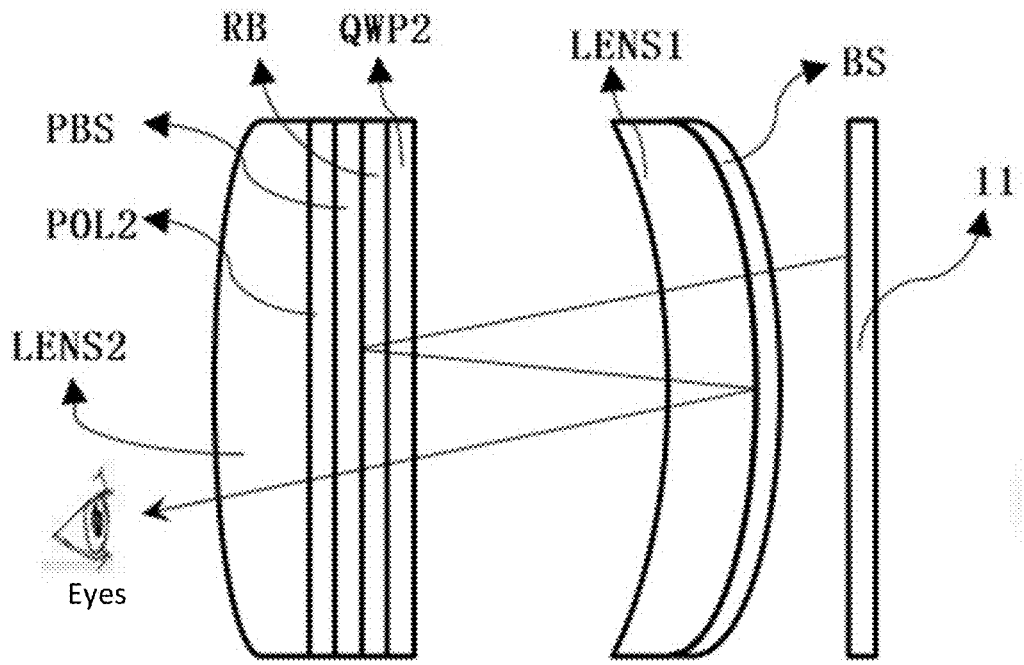
Fig.15

OPTICAL MODULE, NEAR-EYE DISPLAY DEVICE AND LIGHT PROJECTION METHOD

CROSS REFERENCE TO RELATED APPLICATIONS

The present application claims priority to, and the benefit of, Chinese Patent Application No. 2020222060547, filed Sep. 30, 2020; Chinese Patent Application No. 2020112106411, filed Nov. 3, 2020; Chinese Patent Application No. 2020225043473, filed Nov. 3, 2020; Chinese Patent Application No. 2021212736740, filed Jun. 8, 2021; and Chinese Patent Application No. 2020110617713, filed Sep. 30, 2020, each of which is hereby incorporated by reference in its entirety.

TECHNICAL FIELD

The present invention generally relates to the optical field, especially to an optical module, a near-eye display device and a light projection method.

BACKGROUND OF THE INVENTION

In Virtual Reality (VR), Augmented Reality (AR) and other mixed reality technologies, it is needed to employ an optical module to present images to users. The existing optical modules generally have a large volume, as well as a thickness of usually more than 30 mm With the progress in science and technology, users attach more and more importance to the volume and weight of such products. Thus, there is the necessity to develop a product small in volume and light in weight so as to meet the demands from the market. Among others, one of the biggest factors as limited is the optical module therein. In order to solve the aforesaid problems about volume and weight, many companies have launched such VR or AR solutions based on the pancake technical solution, namely optical modules based on a folded optical path.

Such optical modules based on a folded optical path mainly include a lens with the partial-reflective and partial-transmitting function, a quarter phase delay plate and a reflective polarizer as arranged in sequence. After an image source enters the lens with the partial-reflective and partial-transmitting function, and light beams turn back many times between the lens, the phase delay plate and the reflective polarizer, and finally emits out from the reflective polarizer. In virtue of such optical solutions, the product volume has been hugely reduced.

However, in the current pancake solution, light beams incident onto a user's eyes include some unexpected light beams in addition to light beams expected by the user, thereby affecting the user experience. Especially when there is a large incident angle of the light beams, the incident light may not be completely reflected at the time of going through the reflective polarizer for the first time, while light leakage will take place in a large proportion. In this manner, some light will still enter the user's eyes through the reflective polarizer, and the intensity of light leakage may reach 38% of that of the signal light along the optical axis, thereby affecting the user's viewing experience.

The contents in the Background are merely the technologies known by the disclosers, and does not necessarily represent the prior art in the field.

SUMMARY OF THE INVENTION

In light of at least one problem in the prior art, the present invention provides an optical module, comprising:

a partial reflector, receiving circularly polarized light or elliptically polarized light, wherein part of the circularly polarized light or elliptically polarized light is reflected and part of the circularly polarized light or elliptically polarized light transmits through the partial reflector;

a second phase delay unit, located downstream of an optical path of the partial reflector so as to receive and modulate the transmitting circularly polarized light or elliptically polarized light before emission; and a polarized beam splitter, disposed downstream of an optical path of the second phase delay unit, the polarized beam splitter having a light transmission axis, wherein the optical module further comprises a second phase compensation unit located between the second phase delay unit and the polarized beam splitter, and wherein an optical axis of the second phase compensation unit is located in a plane orthogonal to the light transmission axis of the polarized beam splitter, or in a plane orthogonal to a light reflection axis of the polarized beam splitter.

In accordance with one aspect of the present invention, the optical module further comprises a polarizer and a first phase delay unit, located upstream of the optical path of the partial reflector, the polarizer being configured to generate linearly polarized light, and the first phase delay unit is configured to receive the linearly polarized light from the polarizer, modulate the same into circularly polarized light or elliptically polarized light before emitting to the partial reflector.

In accordance with one aspect of the present invention, the second phase compensation unit is configured in such a manner as to modulate light beams initially incident at respective incident angles on the second phase compensation unit according to a polarization state distribution thereof, such that a polarization state of the light beams initially incident at respective incident angles on the second phase compensation unit after transmission through the second phase compensation unit meets the condition for being reflected by the polarized beam splitter.

In accordance with one aspect of the present invention, the first phase delay unit is configured to apply a phase delay of $n*\lambda+3/4\lambda$, or a phase delay of $n*\lambda+1/4\lambda$ to a polarized component in the optical axis direction of the linearly polarized light incident thereon; and the second phase delay unit is configured to apply a phase delay of $n*\lambda+¾\lambda$, or a phase delay of $n*\lambda+¼\lambda$ to a polarized component in the optical axis direction of the linearly polarized light incident thereon, where n is an integer.

In accordance with one aspect of the present invention, light beams reflected by the polarized beam splitter transmit through the second phase compensation unit and the second phase delay unit, are partially reflected by the partial reflector, and transmit again through the second phase delay unit and the second phase compensation unit, a polarization direction of turnback light beams that reach the polarized beam splitter being parallel to the light transmission axis of the polarized beam splitter.

In accordance with one aspect of the present invention, the first phase delay unit and the second phase delay unit are both positive phase delay units or both negative phase delay units, and satisfy the following relation:

$$\alpha_1 = \alpha_2 = 45° \text{ or } 135°$$

$\alpha_1$ is an angle through which a light transmission axis of the polarizer rotates counterclockwise to an optical axis of the first phase delay unit when observed against the optical path direction, and $\alpha_2$ is an angle through which the light transmission axis of the polarized beam splitter rotates counterclockwise to an optical axis of the second phase delay unit when observed against the optical path direction.

In accordance with one aspect of the present invention, the first phase delay unit and the second phase delay unit, opposite in type, are respectively a positive phase delay unit or a negative phase delay unit, and satisfy the following relation:

$$\alpha_1 = -\alpha_2 = 45° \text{ or } 135°$$

$\alpha_1$ is an angle through which the light transmission axis of the polarizer rotates counterclockwise to the optical axis of the first phase delay unit when observed against the optical path direction, and $\alpha_2$ is an angle through which the light transmitting axis of the polarized beam splitter rotates counterclockwise to the optical axis of the second phase delay unit when observed against the optical path direction.

In accordance with one aspect of the present invention, the second phase compensation unit is configured in such a manner as to modulate light beams initially incident at respective incident angles on the second phase compensation unit according to a polarization state distribution thereof, such that a polarization state of the light beams initially incident at respective incident angles on the second phase compensation unit after transmission through the second phase compensation unit meets the condition for being reflected by the polarized beam splitter.

In accordance with one aspect of the present invention, the optical module further comprises a first phase compensation unit located between the first phase delay unit and the polarizer, wherein an optical axis of the first phase compensation unit is located in a plane orthogonal to the light transmission axis of the polarizer, or in a plane orthogonal to a light absorption axis of the polarizer.

In accordance with one aspect of the present invention, the first phase compensation unit is configured in such a manner as to modulate linearly polarized light incident thereon from the polarizer according to a polarization state distribution thereof, such that a polarization state of light beams initially incident on the polarized beam splitter meets the condition for being reflected by the polarized beam splitter.

In accordance with one aspect of the present invention, the optical module further comprises a lens disposed adjacent to the partial reflector.

In accordance with one aspect of the present invention, the partial reflector is a partial-transmitting and partial-reflective layer, the partial-transmitting and partial-reflective layer is attached to a surface of the lens.

The present invention also relates to a near-eye display device, comprising:

a display screen; and an optical module as described above, located downstream of an optical path of the display screen.

The present invention also relates to a light projection method, comprising:

S101: receiving circularly polarized light or elliptically polarized light by a partial reflector, and allowing at least partial transmission of the circularly polarized light or elliptically polarized light;

S102: receiving the transmitting circularly polarized light or elliptically polarized light by a second phase delay unit and modulating the same before emission from the second phase delay unit;

S103: modulating the light beams from the second phase delay unit by a second phase compensation unit located downstream of an optical path of the second phase delay unit before emission from the second phase compensation unit; and S104: receiving light beams from the second phase compensation unit by a polarized beam splitter, the polarized beam splitter being disposed downstream of an optical path of the second phase compensation unit, and the polarized beam splitter having a light transmission axis, allowing transmission of part of the light beams having a polarization direction parallel to the light transmission axis of the polarized beam splitter, and reflecting the rest of the light beams back to the second phase delay unit, wherein an optical axis of the second phase compensation unit is located in a plane orthogonal to the light transmission axis of the polarized beam splitter, or in a plane orthogonal to a light reflection axis of the polarized beam splitter.

In accordance with one aspect of the present invention, the second phase compensation unit is configured in such a manner as to modulate light beams initially incident at respective incident angles on the second phase compensation unit according to a polarization state distribution thereof, such that a polarization state of the light beams initially incident at respective incident angles on the second phase compensation unit after transmission through the second phase compensation unit meets the condition for being reflected by the polarized beam splitter.

In accordance with one aspect of the present invention, the light projection method further comprises:

generating linearly polarized light by a polarizer; and using a first phase delay unit to receive the linearly polarized light from the polarizer, converting the same into circularly polarized light or elliptically polarized light, and emitting the same onto the partial reflector.

In accordance with one aspect of the present invention, the light projection method further comprises:

using a first phase compensation unit located between the first phase delay unit and the polarizer to modulate the linearly polarized light from the polarizer and then making the same incident on the first phase delay unit, wherein an optical axis of the first phase compensation unit is located in a plane orthogonal to a light transmission axis of the polarizer, or in a plane perpendicular to a light absorption axis of the polarizer, wherein the first phase compensation unit is configured in such a manner as to modulate linearly polarized light incident thereon from the polarizer according to a polarization state distribution thereof, such that a polarization state of light beams initially incident on the polarized beam splitter meets the condition for being reflected by the polarized beam splitter.

In accordance with one aspect of the present invention, the first phase delay unit and the second phase delay unit are both positive phase delay units or both negative phase delay units, and satisfy the following relation: $\alpha_1 = \alpha_2 = 45°$ or $135°$; or the first phase delay unit and the second phase delay unit, opposite in type, are respectively a positive phase delay unit or a negative phase delay unit, and satisfy the following relation: $\alpha_1 = -\alpha_2 = 45°$ or $135°$, wherein $\alpha_1$ is an angle through which the light transmission axis of the polarizer rotates counterclockwise to an optical axis of the first phase delay unit when observed against the optical path direction, and $\alpha_2$ is an angle through which the light transmission axis of the polarized beam splitter rotates counterclockwise to the optical axis of the second phase delay unit when observed against the optical path direction.

In accordance with one aspect of the present invention, the light projection method is implemented by an optical module as described above.

With an optical module of one example of the present invention, the occurrence of light leakage in a folded optical path can be reduced, and especially light leakage in a folded optical path can be reduced or eliminated in a large-angle range according to some preferred examples, thereby helping to improve the effect felt by a user.

BRIEF DESCRIPTION OF THE DRAWINGS

The drawings are provided for the purpose of further understanding the present invention, and constitute part of the present invention, which should serve to illustrate the present invention together with the embodiments, but do not make any inappropriate limitation of the present invention. In the drawings:

FIG. 14A shows light leakage in the absence of a phase compensation unit;

FIG. 14B show light leakage in the case where a phase compensation unit is added according to the second aspect of the present invention;

FIG. 15 shows an optical module according to a second example of the second aspect of the present invention;

DETAILED DESCRIPTION OF THE EMBODIMENTS OF THE INVENTION

Figure 1:
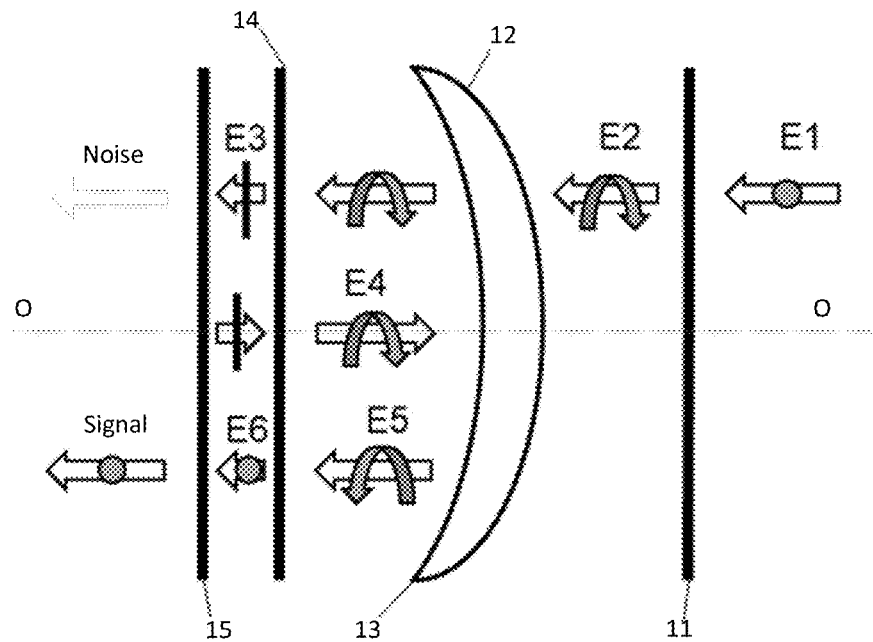
FIG. 1 is a schematic diagram illustrating an optical module based on a folded optical path.

Certain exemplary examples will be described below only in a brief manner. Just as those skilled in the art will appreciate, changes in various ways to the examples described herein can be carried out without departing from the spirit or scope of the present invention. Therefore, the drawings and the following description are deemed essentially exemplary, instead of limitative.

In the description of the present invention, it needs to be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position as shown in the accompanying drawings, and are used only for the purpose of facilitating description of the present invention and simplification of the description, instead of indicating or suggesting that the denoted devices or elements must be specifically oriented, or configured or operated in some specific orientation. Thus, such terms should not be construed to limit the present invention. In addition, such terms as "first" and "second" are only used for the purpose of description, rather than indicating or suggesting relative importance or implicitly indicating the number of the designated technical features. Accordingly, features defined with "first" or "second" may, expressly or implicitly, include one or more of such features. In the description of the present invention, "more" means two or above, unless otherwise defined explicitly and specifically.

In the description of the present invention, it needs to be noted that, unless otherwise specified and defined explicitly, such terms as "mount" "link" and "connect" should be understood as generic terms. For example, connection may refer to fixed connection, dismountable connection, or integrated connection; also to mechanical connection, electric connection or intercommunication; further to direct connection, or connection by an intermediary medium; or even to internal communication between two elements or interaction between two elements. For those skilled in the art, they can construe the specific meaning of such terms herein in light of specific circumstances.

In the description of the present invention, it needs to be noted that, unless otherwise specified and defined explicitly, such terms as "plate" and "film" should be understood as generic terms, which, for example, may be an independent optical element, or may be a filmed layer attached to a lens or a transparent substrate.

Herein, unless otherwise specified and defined explicitly, if a first feature is "above" or "below" a second one, this may cover the direct contact between the first and second features, also cover the contact via another feature therebetween, instead of the direct contact. Furthermore, if a first feature "above", "over" or "on the top of" a second one, this may cover that the first feature is right above or on the inclined top of the second feature, or just indicate that the first feature has a horizontal height higher than that of the second feature. If a first feature is "below", "under" or "on the bottom of" a second feature, this may cover that the first feature is right below and on the inclined bottom of the second feature, or just indicates that the first feature has a horizontal height lower than that of the second feature.

The disclosure below provides many different embodiments and examples so as to achieve different structures described herein. In order to simplify the disclosure herein, the following will give the description of the parts and arrangements embodied in specific examples. Surely, they are just for the exemplary purpose, not intended to limit the present invention. Besides, the present invention may repeat a reference number and/or reference letter in different examples, and such repeat is for the purpose of simplification and clarity, which does not represent any relation among various embodiments and/or arrangements as discussed. In addition, the present invention provides examples for a variety of specific techniques and materials, but those skilled in the art can be aware of the application of other techniques and/or use of other materials.

The examples of the present invention will be introduced below along with the drawings. It should be appreciated that the examples described herein are only for the purpose of illustrating and explaining, instead of restricting, the present invention.

First Aspect

FIG. 1 illustrates an optical module based on a folded optical path. In the figure, the right is the object side where, for example, a display screen is placed while the left is the image side (an observation side), namely a position where a user's eyeballs are located. In the optical module as shown in FIG. 1, it in turn comprises a quarter wave plate 11, a partial reflector 13 (such as a partial-transmitting and partial-reflective layer 13) (attached to a lens 12 as shown in FIG. 1), a quarter wave plate 14, and a polarized beam splitter 15 in an optical path direction (from the object side to the image side). Theoretically, a light beam E1 (linearly polarized light) from the object side goes in turn through the quarter wave plate 11, the lens 12 and the partial-transmitting and partial-reflective layer 13, and the quarter wave plate 14, and then is incident on the polarized beam splitter 15. A light beam E3 initially incident on the polarized beam splitter 15 is linearly polarized light, and the polarization direction thereof is perpendicular to a light transmission axis of the polarized beam splitter 15, and the light beam E3 thus, in theory, should be reflected by the polarized beam splitter 15, then be reflected by the partial-transmitting and partial-reflective layer 13 after transmission through the quarter wave plate 14, then go again through the quarter wave plate 14, and be again incident on the polarized beam splitter 15. At this time, the polarized light E6 has a polarization direction parallel to the light transmission axis of the polarized beam splitter 15, and thus can transmit through the polarized beam splitter 15, as shown by the "SIGNAL" in FIG. 1. However, in an actual folded optical path, part of the light beams initially incident on the polarized beam splitter 15 will transmit through the polarized beam splitter 15 to form the "NOISE" shown in FIG. 1, which means that the phenomenon of light leakage takes place. Especially when there is a large incident angle formed between incident light beams and the optical axis OO of the optical module (in the horizontal direction in FIG. 1), such phenomenon of light leakage becomes much worse, and the intensity of light leakage (the intensity of noise) even can reach 38% of that of the axial signal light, thereby seriously interfering with the viewing experience of a user.

The inventors of the present application find that the aforesaid problem can be solved by disposing one or more phase compensation units in the optical path. And further preferably, further improvement can be made together by setting the parameters of some elements in the optical module. The detailed description will be made below.

Figure 2:
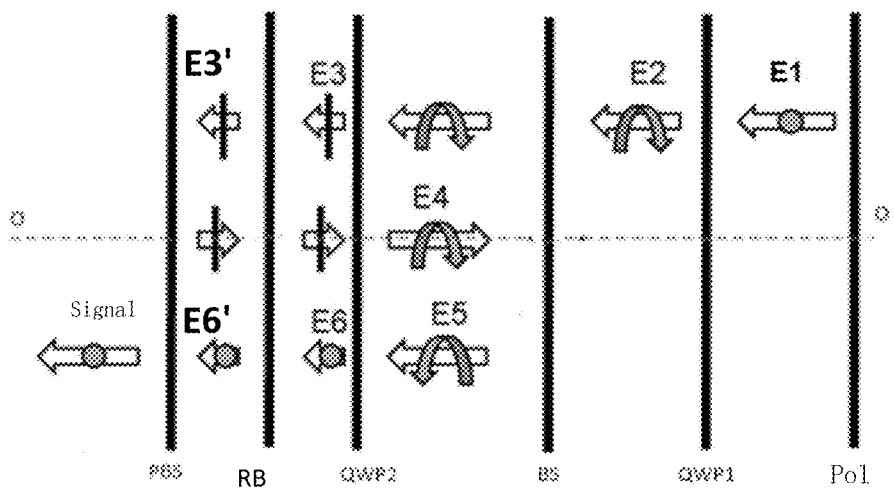
FIG. 2 is a schematic diagram illustrating an optical module according to one embodiment of the first aspect of the present invention.

FIG. 2 shows an optical module 20 according to one example of the present invention, which will be described below in a detailed manner by referring to FIG. 2. As shown in FIG. 2, the optical module 20 comprises, in an optical path direction (from an object side to an image side, i.e., from the right to the left in the figure), a polarizer Pol, a first phase delay unit QWP1, a partial-transmitting and partial-reflective layer BS, a second phase delay unit QWP2, and a polarized beam splitter PBS, and further comprises a second phase compensation unit RB, located between the second phase delay unit QWP2 and the polarized beam splitter PBS.

Among them, the polarizer Pol is configured to receive incident light beams, and modulate the same into linearly polarized light E1, and the first phase delay unit QWP1 is configured to receive the linearly polarized light E1 from the polarizer Pol, and modulate the same into circularly polarized light or elliptically polarized light E2. The partial-transmitting and partial-reflective layer BS is located optically downstream of the first phase delay unit QWP1, receive the circularly polarized light or elliptically polarized light E2, and make the same transmit in part and reflected in part. The second phase delay unit QWP2 is located optically downstream of the partial-transmitting and partial-reflective layer BS, the second phase compensation unit RB is located optically downstream of the second phase delay unit QWP2, and the polarized beam splitter PBS is disposed optically downstream of the second phase compensation unit RB, the polarized beam splitter PBS having a light transmission axis.

Described below is the working process of the optical module 20 as shown in FIG. 2. The polarizer Pol receives incident light beams and emits linearly polarized light E1, then the linearly polarized light E1 passes through the first phase delay unit QWP1 to be modulated into circularly polarized light or elliptically polarized light E2, and the circularly polarized light or elliptically polarized light E2 is incident on the partial-transmitting and partial-reflective layer BS. The partial-transmitting and partial-reflective layer BS is located optically downstream of the first phase delay unit QWP1, and receives the circularly polarized light or elliptically polarized light E2, allowing at least partial transmission of the circularly polarized light or elliptically polarized light. The present invention imposes no limitation on the specific transmissivity of the partial-transmitting and partial-reflective layer BS, which may be 50% or in other proportions. The light beams that transmit partially and go through the second phase delay unit QWP2 are modulated into linearly polarized light E3, and the linearly polarized light E3 are incident on the second phase compensation unit RB and are modulated into linearly polarized light E3'. The linearly polarized light E3' has a polarization direction perpendicular to the light transmission axis of the polarized beam splitter PBS, so it is reflected by the polarized beam splitter PBS and turnback takes place. Subsequently, the turnback light beam transmits through the second phase compensation unit RB and the second phase delay unit QWP2 (circularly polarized light or elliptically polarized light E4), then is reflected by the partial-transmitting and partial-reflective layer BS (circularly polarized light or elliptically polarized light E5), goes again through the second phase delay unit QWP2 (linearly polarized light E6) and the second phase compensation unit RB (linearly polarized light E6'), and is incident again on the polarized beam splitter PBS. The polarized beam splitter PBS is disposed optically downstream of the second phase delay unit QWP2, and the polarized beam splitter has a light transmission axis $T_{PBS}$, allowing transmission of some of the light beams having a polarization direction parallel to the light transmission axis $T_{PBS}$, and reflecting the rest of the light beams back to the second phase delay unit QWP2. At this time, the polarized light E6' has a polarization direction parallel to the light transmission axis of the polarized beam splitter PBS, and thus can transmit through the polarized beam splitter PBS. That is to say, light beams reflected by the polarized beam splitter PBS transmit through the second phase compensation unit RB and the second phase delay unit QWP2, then are reflected in part by the partial-transmitting and partial-reflective layer BS, and transmit again through the second phase delay unit QWP2 and the second phase compensation unit RB. A polarization direction of the turnback light beams that reach the polarized beam splitter PBS is parallel to the light transmission axis of the polarized beam splitter PBS so as to enable the transmission to form a signal (light).

In the example illustrated by FIG. 2, a second phase compensation unit RB is added between the second phase delay unit QWP2 and the polarized beam splitter PBS so as to make the polarization state of the light beam E3' initially incident at respective incident angles on the polarized beam splitter PBS satisfy or as far as possible satisfy the condition for being reflected by the polarized beam splitter PBS, thereby greatly reducing the intensity of light leakage and stray light. In this manner, the intensity of stray light can be reduced to 5% of that of signal light, while the signal light may not be affected substantially. The dot or arrow on the arrow for denoting a light beam in FIG. 2 represents the corresponding polarization state of the light beam. In addition, the structure of the optical module 20 in FIG. 2 may not include the polarizer Pol or the first phase delay unit QWP1. The polarizer Pol and the first phase delay unit QWP1 may be integrated into a light source (e.g., a screen) upstream of the optical module 20. At the same time, the light beam incident on the first phase delay unit QWP1 may be linearly polarized light, or may be the linearly polarized light with a certain circularly polarized component.

As compared with the optical structure of FIG. 1, the optical module 20 in FIG. 2 comprises a second phase compensation unit RB located between the second phase delay unit QWP2 and the polarized beam splitter PBS. According to one preferred example of the present invention, an optical axis of the second phase compensation unit RB is located in a plane orthogonal to the light transmission axis $T_{PBS}$ of the polarized beam splitter PBS, or in a plane orthogonal to a light reflection axis of the polarized beam splitter PBS. According to one example of the present invention, the second phase compensation unit RB is configured in such a manner as to modulate light beams initially incident at respective incident angles on the second phase compensation unit RB according to a polarization state distribution thereof, such that a polarization state of the light beams initially incident at respective incident angles on the second phase compensation unit RB after transmission through the second phase compensation unit RB meets the condition for being reflected by the polarized beam splitter PBS. A person skilled in the art readily understands that, in the present invention, although the second phase compensation unit RB makes the polarization state of the light beams initially incident at respective incident angles on the polarized beam splitter PBS satisfy the condition for being reflected by the polarized beam splitter, this does not necessarily make the polarization state of the light beams initially incident on the polarized beam splitter completely satisfy the condition for being reflected. As long as the polarization state of a larger proportion of the light beams meets the condition for being reflected (as compared with the circumstance where no phase compensation unit is provided), the above condition is met.

Additionally, in the context of the present invention, an "orthogonal" or "perpendicular" relation covers the circumstance where 90 degrees are formed between each other, but is not strictly limited to such circumstance. For example, any case within the scope of 90°±5° can be regarded as "orthogonal" or "perpendicular".

In accordance with one preferred example of the present invention, the first phase delay unit QWP1 is configured to enable a polarized component in the optical axis direction of the linearly polarized light incident thereon to generate a phase delay of $n*\lambda+\frac{3}{4}\lambda$, or a phase delay of $n*\lambda+\frac{1}{4}\lambda$; and the second phase delay unit QWP2 is configured to enable a polarized component in the optical axis direction of the linearly polarized light incident thereon to generate a phase delay of $n*\lambda+\frac{3}{4}\lambda$, or a phase delay of $n*\lambda+\frac{1}{4}\lambda$, where n is an integer. In accordance with one preferred example of the present invention, the first phase delay unit QWP1 and the second phase delay unit QWP2 are quarter wave plates.

Figure 3:
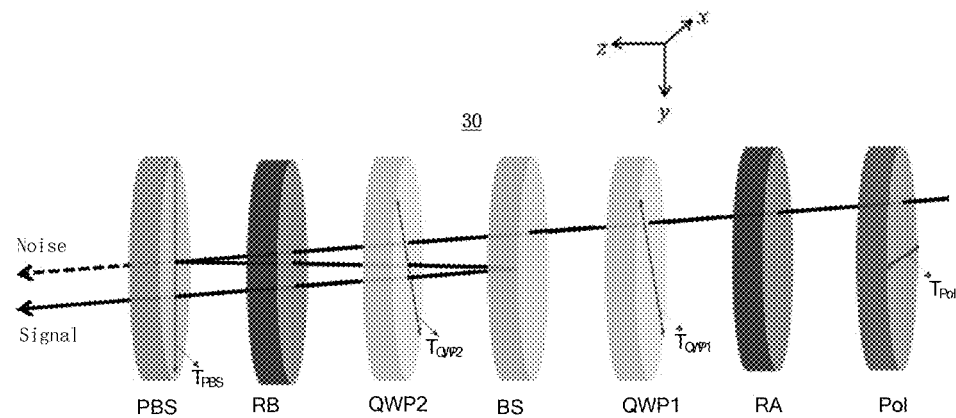
FIG. 3 is a schematic diagram illustrating an optical module according to another embodiment of the present invention.

Moreover, preferably, a first phase compensation unit RA may also be disposed optically upstream of the first phase delay unit QWP1, in addition to the second phase compensation unit RB disposed between the second phase delay unit QWP2 and the polarized beam splitter PBS. FIG. 3 shows an optical module 30 according to such an example, wherein a first phase compensation unit RA is located between the first phase delay unit QWP1 and the polarizer Pol. FIG. 3 also shows an x-y-z coordinate system, wherein the positive x direction is perpendicular inward to the paper surface, the positive y direction is vertical downward, and the positive z direction is horizontal leftward (from the object side to the image side) (i.e., a direction along the optical path). The detailed description will be made below by referring to the figure.

Among them, the optical axis of the first phase compensation unit RA is located in a plane orthogonal to a light transmission axis $T_{Pol}$ of the polarizer Pol, or in a plane orthogonal to a light absorption axis of the polarizer Pol. When the first phase compensation unit RA is provided, the linearly polarized light with a certain circularly polarized component is emitted after linearly polarized light E1 from the polarizer Pol goes through the first phase compensation unit RA, and then it passes through the first phase delay unit QWP1 to be modulated into circularly polarized light or elliptically polarized light E2. In accordance with one example of the present invention, the first phase compensation unit RA is configured in such a manner as to modulate linearly polarized light incident thereon in respective directions from the polarizer Pol according to a polarization state distribution, such that a polarization state of the light beams initially incident at respective incident angles on the polarized beam splitter meets the condition for being reflected by the polarized beam splitter. A person skilled in the art readily understands that, in the present invention, although the first phase compensation unit RA makes the polarization state of the light beams initially incident at respective incident angles on the polarized beam splitter PBS satisfy the condition for being reflected by the polarized beam splitter, this does not necessarily make the polarization state of the light beams initially incident on the polarized beam splitter completely satisfy the condition for being reflected. This condition is met as long as the polarization state of a larger proportion of the light beams meets the condition for being reflected (as compared with the circumstance where no phase compensation unit is provided)

Therefore, in the example illustrated by FIG. 3, the first phase compensation unit RA and the second phase compensation unit RB perform joint compensation for the phase of the light beams, wherein the first phase compensation unit RA is configured to modulate linearly polarized light incident thereon in respective directions from the polarizer Pol according to the polarization state distribution thereof, and the second phase compensation unit RB is configured to modulate the light beams initially incident at respective incident angles on the second phase compensation unit RB according to the polarization state distribution thereof, such that the polarization state of the light beams initially incident on the polarized beam splitter PBS meets the condition for being reflected by the polarized beam splitter PBS.

In the examples illustrated by FIGS. 2 and 3, the optical modules 20 and 30 both include the polarizer Pol. But the present invention is not limited to this, and the optical modules 20 and 30 may also not comprise a polarizer Pol that, for example, may be integrated with a light source (e.g., a screen) upstream of the optical path. These all fall into the protection scope of the present invention.

A skilled in the art readily understands that a phase compensation amount of the first phase compensation unit RA or the second phase compensation unit RB is not limited to some specific value, as long as it can help to improve the reflected proportion of the light beams when being initially incident on the polarized beam splitter PBS. In addition, the first phase compensation unit RA and the second phase compensation unit may both be composed of a single phase compensation plate, or may comprise a plurality of phase compensation plates, and the present invention does not limit the specific number. In the specific optical design, upon the given wavelength, the given optical parameters of the polarizer Pol, the first phase delay unit QWP1, the second phase delay unit QWP2 and the PBS, as well as the given orientation parameters of the above devices, the first phase compensation unit RA and the second phase compensation unit RB can be designed as long as the reflected proportion of the light beams when being initially incident on the polarized beam splitter PBS can be increased relative to the case where the first phase compensation unit RA or the second phase compensation unit RB is not provided. The specific calculation method will not be repeated here.

In accordance with one example of the present invention, the optical module further comprises a lens disposed adjacent to the partial-transmitting and partial-reflective layer BS, and the partial-transmitting and partial-reflective layer BS can be attached to a surface of the lens, for example.

Further preferably, light leakage can be further eliminated or reduced by setting the type of the first phase delay unit and the angle relation of the optical axis. In order to clearly describe the present invention, it is necessary to distinguish the "positive" and "negative" types of the first phase delay unit QWP1 and the second phase delay unit QWP2. "Positive" and "negative" types are defined as follows.

A positive phase delay unit refers to the one that applies a phase delay of $N*\lambda+1/4\lambda$ to a polarized component of the incident light beams along the optical axis, where N is an integer; and A negative phase delay unit refers to the one that applies a phase delay of $M*\lambda+3/4\lambda$ to a polarized component of the incident light beams along the optical axis, where M is an integer.

In accordance with one example of the present invention, the light leakage phenomenon as shown in FIG. 1 can be further alleviated when the following relation is satisfied: the first phase delay unit QWP1 and the second phase delay unit QWP2 are both positive phase delay units or both negative phase delay units, and satisfy the following relation: $\alpha_1=\alpha_2=45°$ or $135°$; or the first phase delay unit and the second phase delay unit, opposite in type, are respectively a positive phase delay unit or a negative phase delay unit, and satisfy the following relation: $\alpha_1=-\alpha_2=45°$ or $135°$, wherein $\alpha_1$ is an angle through which a polarization direction D1 of the linearly polarized light incident on the first phase delay unit QWP1 under normal incidence rotates counterclockwise to an optical axis $T_{QWP1}$ of the first phase delay unit QWP1 when observed against the optical path direction (i.e., observing from the left to the right in FIG. 2 or 3), and $\alpha_2$ is an angle through which the light transmission axis $T_{PBS}$ of the polarized beam splitter rotates counterclockwise to an optical axis $T_{QWP2}$ of the second phase delay unit QWP2 when observed against the optical path direction. A person skilled in the art readily understands that the equations listed above allow an error within the engineering acceptable range. For example, when any difference between these two and a target angle is within plus or minus 5 degrees, the above equations can be considered to be satisfied. Taking the target angle of $\alpha_1=\alpha_2=45°$ as an example, the case of $\alpha_1=40°$ and $\alpha_2=50°$ in practice can be considered to satisfy $\alpha_1=\alpha_2=45°$.

If the optical module comprises a polarizer, the light transmission axis of the polarizer Pol is parallel to the polarization direction D1 of the linearly polarized light incident on the first phase delay unit QWP1 under normal incidence, so $\alpha_1$ is an angle through which the light transmission axis of the polarizer rotates counterclockwise to the optical axis $T_{QWP1}$ of the first phase delay unit QWP1 when observed against the optical path direction (i.e., observed from the left to the right in FIG. 2).

Figure 4A:
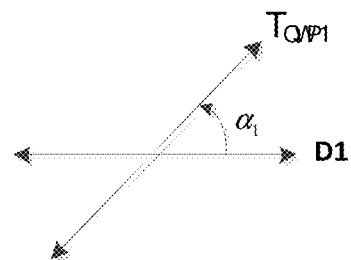
FIGS. 4A, 4B, 4C and 4D are schematic diagrams showing the optical parameters of the optical module according to one example of the present invention respectively.
Figure 4B:
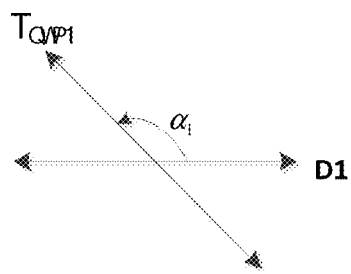
Figure 4C:
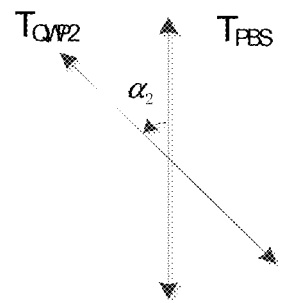
Figure 4D:
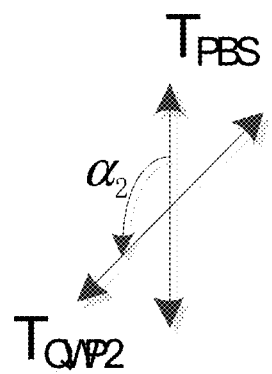

FIG. 4A shows the case where $\alpha_1$ is an angle of 45 degrees, FIG. 4B shows the case where $\alpha_1$ is an angle of 135 degrees, FIG. 4C shows the case where $\alpha_2$ is an angle of 45 degrees, and FIG. 4D shows the case where $\alpha_2$ is an angle of 135 degrees. When light beams incident on the first phase delay unit QWP1 are linearly polarized light, the polarization direction D1 is exactly the polarization direction of the linearly polarized light. Alternatively, when a polarizer is disposed upstream of the first phase delay unit QWP1, the polarization direction then corresponds to the light transmission axis of the polarizer.

In the aforesaid examples, by adding the first phase compensation unit RA and the second phase compensation unit RB and setting the types of the first phase delay unit QWP1 and the second phase delay unit QWP2, as well as the angle relation of the optical axis, the polarization state of light beams initially incident at respective incident angles on the polarized beam splitter PBS can be enabled to satisfy or as far as possible satisfy the condition for being reflected by the polarized beam splitter PBS, namely, making the polarization direction perpendicular to or as far as possible perpendicular to the light transmission axis $T_{PBS}$ of the polarized beam splitter PBS, or parallel to or as far as possible parallel to the light reflection axis of the polarized beam splitter PBS.

Moreover, the present invention, for the sake of clarity, distinguishes a light beam incident initially (first) on the polarized beam splitter from a light beam incident again on the polarized beam splitter. Referring to FIG. 2, the light beam E1 after its passage through the first phase compensation unit RA, the first phase delay unit QWP1, the partial-transmitting and partial-reflective layer BS and the second phase delay unit QWP2 is modulated into a light beam E3' and is incident on the polarized beam splitter PBS. Then the light beam E3' is called a light beam incident initially (first) on the polarized beam splitter PBS, and the light beam E3 is called a light beam incident initially (first) on the second phase compensation unit RB; while the light beam E6' is called a light beam incident again on the polarized beam splitter, and the light beam E6 is called a light beam incident again on the second phase compensation unit RB; meanwhile, the light beams E4, E5, E6 and E6' all can be referred to as a turnback light beam. The optical path structure in other drawings may also be appreciated in the same way, and the relevant description will not be repeated here.

As compared with the solution about a folded optical path in the prior art, the technical solution of the present invention can be employed to achieve that the light beams incident initially on the polarized beam splitter PBS transmit in a smaller proportion through the polarized beam splitter PBS, so the noise (stray light) as produced becomes less. Most of the light beams are reflected to form turnback light beams. When they are incident again on the polarized beam splitter PBS, their polarization direction is parallel to or as far as possible parallel to the light transmission axis $T_{PBS}$ of the polarized beam splitter PBS, so they can transmit and form a signal (light).

Additionally, in the present invention, the first phase compensation unit RA and the second phase compensation unit RB are named along the optical path direction of the optical module, and this does not represent that there is necessarily a first phase compensation unit RA. For example, a first phase compensation unit RA is not included in the example as illustrated by FIG. 2.

The inventors tested the effect of the present invention using the following specific examples.

Example 1

Figure 5:
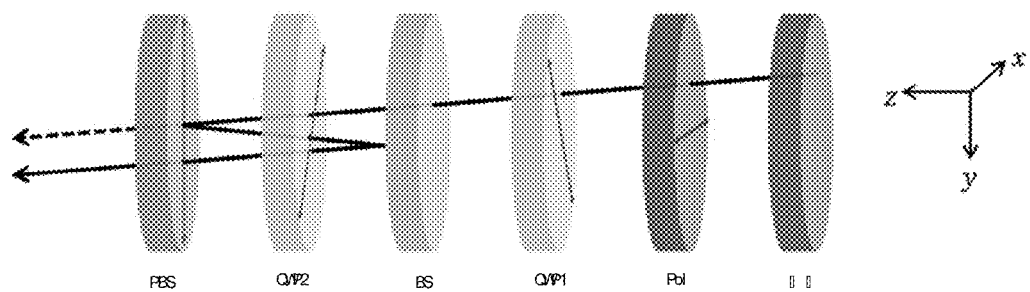
FIG. 5 is a schematic diagram illustrating an optical module according to Example 1 of the present invention.

The optical path structure of Example 1 is as shown in FIG. 5, in which there is a luminous screen on the optically upstream side of an absorbent polarizer Pol. The specific parameters of the optical path structure of Example 1 are listed as follows:

The absorbent polarizer Pol has a light transmission axis parallel to the x-axis; the first phase delay unit QWP1 is a positive phase delay unit, comprising a quarter wave plate having a type of $n_o<n_e$ and an optical axis satisfying $\alpha_1=45°$; the partial-transmitting and partial-reflective layer BS has a transmissivity of 50% and a reflectivity of 50%; the second phase delay unit QWP2 is a positive phase delay unit, comprising a quarter wave plate having a type of $n_o<n_e$ and an optical axis satisfying $\alpha_2=\alpha_1=45°$; and the polarized beam splitter PBS has a light transmission axis parallel to the y-axis.

For the convenience of explanation, the polarization state of light during its propagation is represented by a Pioncare sphere. The incident angle θ and azimuth angle φ of a light beam are defined as follows: θ is an included angle between the light beam and the positive direction of the z-axis, and φ is an included angle between a projection of the light beam in the x-y plane and the positive direction of the x-axis.

Figure 6A:
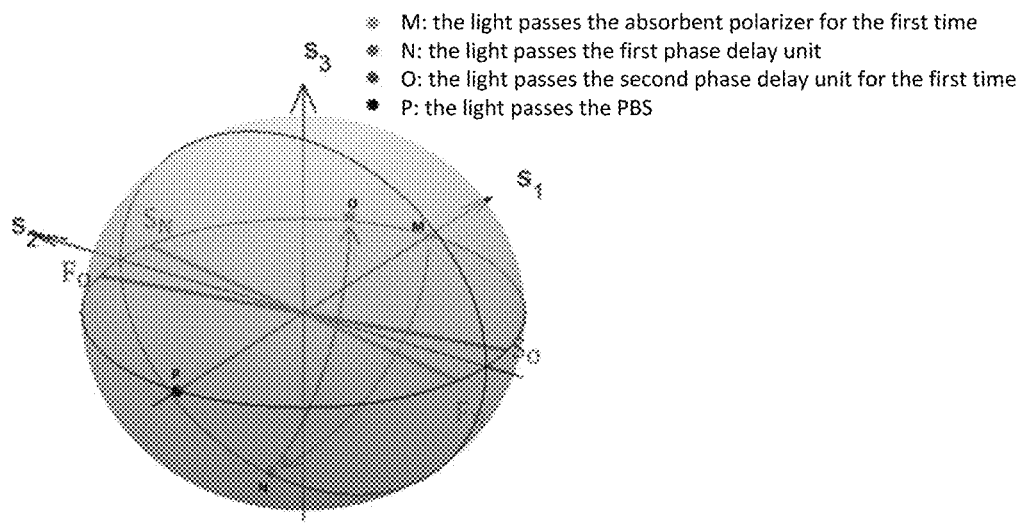
FIGS. 6A and 6B each show the variation in the polarization state of light beams incident at a particular angle in the optical module according to Example 1 of the present invention.
Figure 6B:
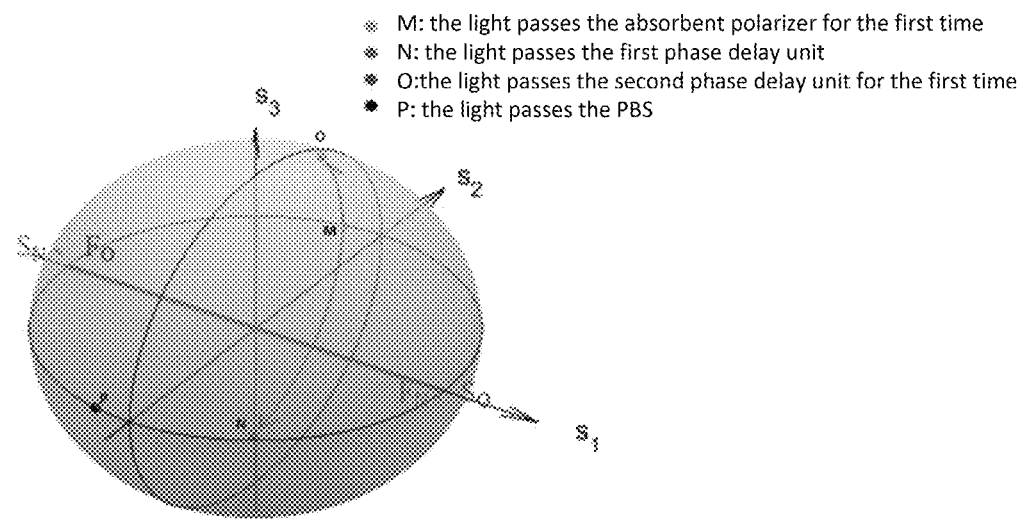
Figure 6C:
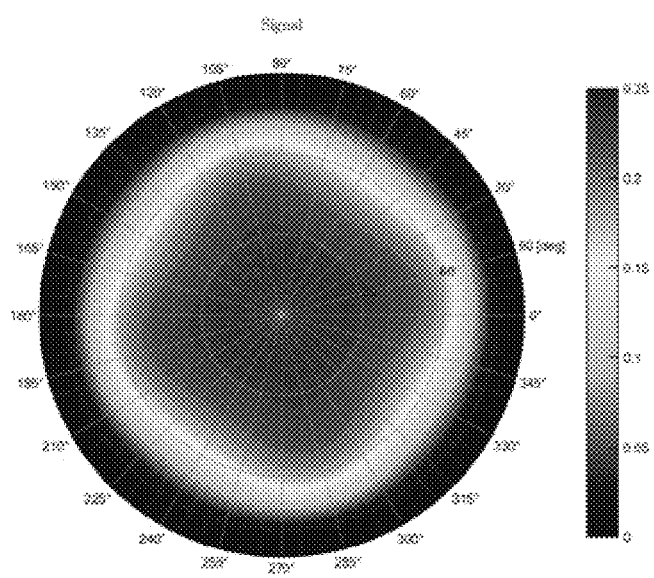
FIGS. 6C and 6D each show the distribution of the intensity of the signal light and stray light at different incident angles of the light beams in the optical module according to Example 1 of the present invention.
Figure 6D:
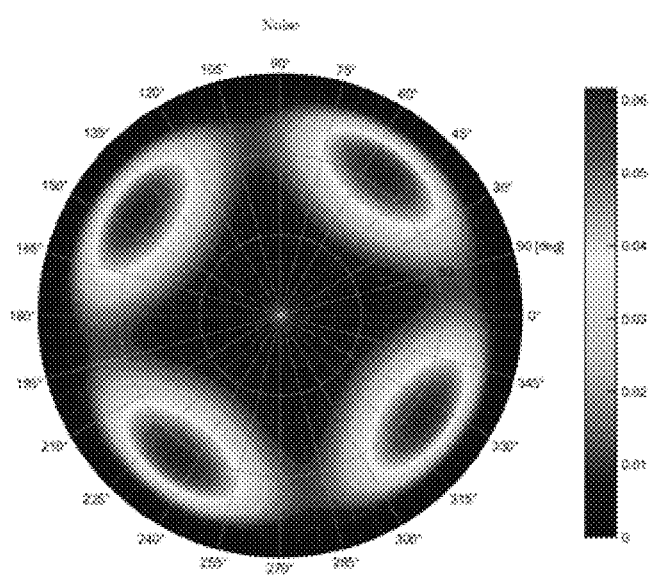

The distribution of the intensities of signal light and stray light according to different incident angles is as shown in FIG. 6C and FIG. 6D. From the figures, it can be seen that when θ of a light beam is less than 30°, the intensity of the signal light is much greater than that of the stray light, and the light leakage phenomenon is not significant in this area.

FIG. 6A shows the polarization states of an incident light beam incident at θ=60°, φ=90° after its passes for the first time through the absorbent polarizer Pol, the first phase delay unit QWP1, the second phase delay unit QWP2 and the polarized beam splitter PBS in sequence in Example 1, which are denoted by a green dot M, a magenta dot N, a red dot O and a black dot P respectively; when light is incident at θ=60°, φ=90°, a rotation axis composed of the fast axis and the slow axis of the first phase delay unit QWP1 is denoted by a magenta straight line $F_OS_O$, and a rotation axis composed of the fast axis and the slow axis of QWP2 is denoted by a red straight line $F_NS_N$, as shown in FIG. 6A; and when light is incident at θ=60°, φ=90°, the process of polarization modulation after it passes for the first time through the first phase delay unit QWP1 and the second phase delay unit QWP2 is expressed on the Poincare sphere as: QWP1 modulation process—clockwise rotation of point M around the magenta straight line $F_NS_N$ through 90° to point N; and QWP2 modulation process—clockwise rotation of point N around the red straight line $F_OS_O$ through 90° to point O. (the clockwise rotation refers to clockwise rotation with regard to the straight line FS when viewed from F end to S end)

When light is incident at θ=60°, φ=90°, the polarization state conforming to the reflection condition by the polarized beam splitter PBS on the Pioncare sphere is a point symmetrical with the black point P about the spherical center (that point coincides with the green point M at this time). Furthermore, it can be seen from FIG. 6A that after the light incident at θ=60°, φ=90° passes for the first time through the absorbent polarizer Pol, the first phase delay unit QWP1 and the second phase delay unit QWP2 in sequence, its polarization state (the red point O) does not coincide with the green point M, and the included angle formed by the radiuses at the two points is large, so the light that first reaches the polarized beam splitter PBS will not be fully absorbed, and light leakage will occur to a certain degree.

FIG. 6B shows the polarization state of an incident light beam incident at θ=60°, φ=45° after passing for the first time through the absorbent polarizer Pol, the first phase delay unit QWP1, the second phase delay unit QWP2 and the polarized beam splitter PBS in sequence in Example 1, which are denoted by a green dot M, a magenta dot N, a red dot O and a black dot P respectively; when light is incident at θ=60°, φ=45°, the polarization state conforming to the reflection condition by the PBS on the Pioncare sphere is a point symmetrical with the black point P about the spherical center. Furthermore, it can be seen from FIG. 6B that after the light incident at θ=60°, φ=45° passes for the first time through the absorbent polarizer, the first phase delay unit QWP1 and the second phase delay unit QWP2 in sequence, its polarization state does not coincide with the point symmetrical with point P about the spherical center and the included angle formed by the radiuses at the two points is very large, so the light that first reaches the polarized beam splitter PBS will, in part, directly pass through the polarized beam splitter PBS, instead of being completely reflected, and light leakage will occur to a certain degree.

According to the solution of Example 1, when θ is large, the intensity of the stray light is comparable to that of the signal light, especially when the case approaches θ=65° and $$\varphi = \frac{(2n+1)\pi}{4},$$

and there is a certain light leakage phenomenon at this time.

Example 2

Figure 7:
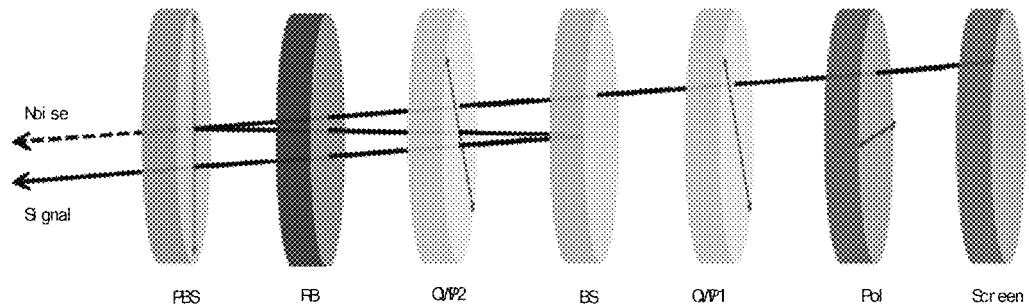
FIG. 7 is a schematic diagram illustrating an optical module according to Example 2 of the present invention.

FIG. 7 shows an optical path structure according to Example 2. As compared with Example 1, the optical path structure of Example 2 differs in adding a second phase compensation unit RB.

The second phase delay unit QWP2 is a negative phase delay unit, which is composed of a quarter wave plate having a type of $n_o > n_e$ and an optical axis satisfying $\alpha_2 = -\alpha_1 = -45°$ (i.e., 135°). And the first phase delay unit QWP1 is a positive phase delay unit.

The second phase compensation unit RB may be formed in many configurations. The parameters of the second phase compensation unit RB as selected in this example are shown in the table below, which includes a phase delay plate B1 and a phase delay plate B2 superimposed in the optical path direction. Among them, the parameters of the phase delay plate B1 are as follows: $n_o < n_e$; the optical axis direction being parallel to the x-axis; and the retardance (the amount of phase delay) being 133 nm. And the parameters of the phase delay plate B2 are as follows: $n_o < n_e$; the optical axis direction being parallel to the z-axis; and the retardance being 104 nm.

|  | Phase Delay Plate B1 | Phase Delay Plate B2 |
| --- | --- | --- |
| Optical Axis Direction | Parallel to x-axis | Parallel to z-axis |
| Retardance | 133 nm | 104 nm |
| Type | $n_o < n_e$ | $n_o < n_e$ |

Figure 8A:
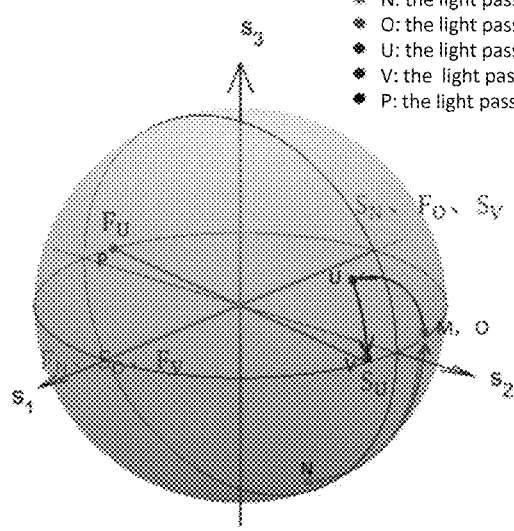
FIG. 8A shows the polarization state of the light beams in the optical module according to Example 2 of the present invention.

According to the variation in the polarization state of the light incident at θ=60, φ=45° in the structure of Example 2, as shown in FIG. 8A, it can be seen that the polarization state point V of the light that passes for the first time through the second phase compensation unit almost coincides with the point symmetrical with point P about the spherical center. Therefore, the light beam is almost completely reflected without any light leakage when entering the polarized beam splitter PBS for the first time.

Figure 8B:
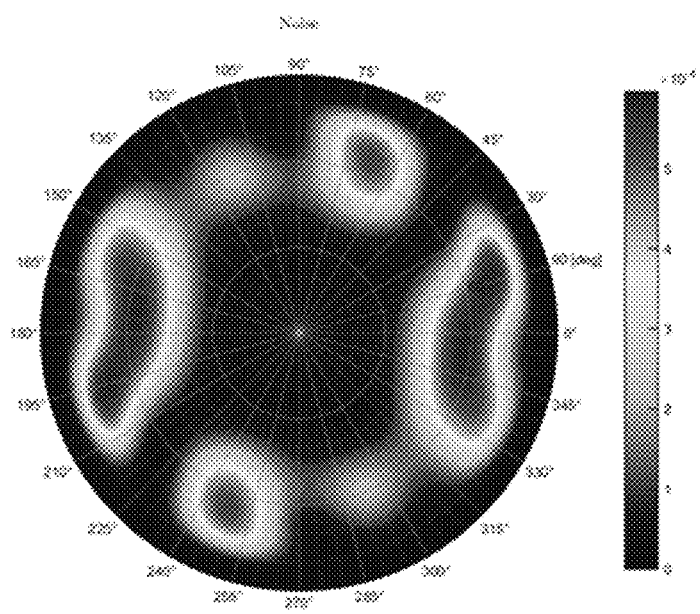
FIG. 8B shows the distribution of the intensity of the signal light and stray light at different incident angles of the light beams in the optical module according to Example 2 of the present invention.

The distribution of the intensity of the stray light according to the different incident angles of the light beams is as shown in FIG. 8B. As compared with 6D, this example greatly reduces the light leakage in a folded optical path, and the leakage intensity is reduced to 10% of the original.

Example 3

Figure 9:
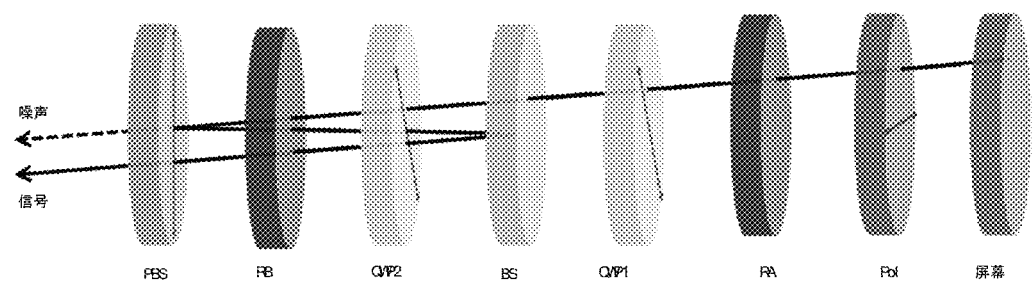
FIG. 9 is a schematic diagram illustrating an optical module according to Example 3 of the present invention.

FIG. 9 shows an optical path structure according to Example 3. As compared with the one of Example 1, the optical path structure of Example 3 differs in adding a first phase compensation unit RA and a second phase compensation unit RB.

The second phase delay unit QWP2 is a negative phase delay unit, which is composed of a quarter wave plate having a type of $n_o > n_e$ and an optical axis satisfying $\alpha_2 = -\alpha_1 = -45°$. And the first phase delay unit QWP1 is a positive phase compensation unit.

The first phase compensation unit RA may be formed in many configurations. The parameters of the first phase compensation unit RA as selected in this example are as follows, which includes a phase delay plate A1 and a phase delay plate A2 superimposed in the optical path direction. Among them, the parameters of the phase delay plate A1 are as follows: $n_o < n_e$; the optical axis direction being parallel to the x-axis; and the retardance being 206 nm. And the parameters of the phase delay plate A2 are as follows: $n_o < n_e$; the optical axis direction being parallel to the y-axis; and the retardance being 85 nm.

|  | Phase Delay Plate A1 | Phase Delay Plate A2 |
| --- | --- | --- |
| Optical Axis Direction | Parallel to x-axis | Parallel to y-axis |
| Retardance | 206 nm | 85 nm |
| Type | $n_o < n_e$ | $n_o > n_e$ |

The second phase compensation unit RB may be formed in many configurations. The parameters of the second phase compensation unit RB as selected in this example are as follows, which includes a phase delay plate B1 and a phase delay plate B2 superimposed in the optical path direction. Among them, the parameters of the phase delay plate B1 are as follows: $n_o > n_e$; the optical axis direction being parallel to the x-axis; and the retardance being 85 nm. And the parameters of the phase delay plate B2 are as follows: $n_o > n_e$; the optical axis direction being parallel to the y-axis; and the retardance being 206 nm.

|  | Phase Delay Plate B1 | Phase Delay Plate B2 |
| --- | --- | --- |
| Optical Axis Direction | Parallel to x-axis | Parallel to y-axis |
| Retardance | 85 nm | 206 nm |
| Type | $n_o > n_e$ | $n_o > n_e$ |

Figure 10A:
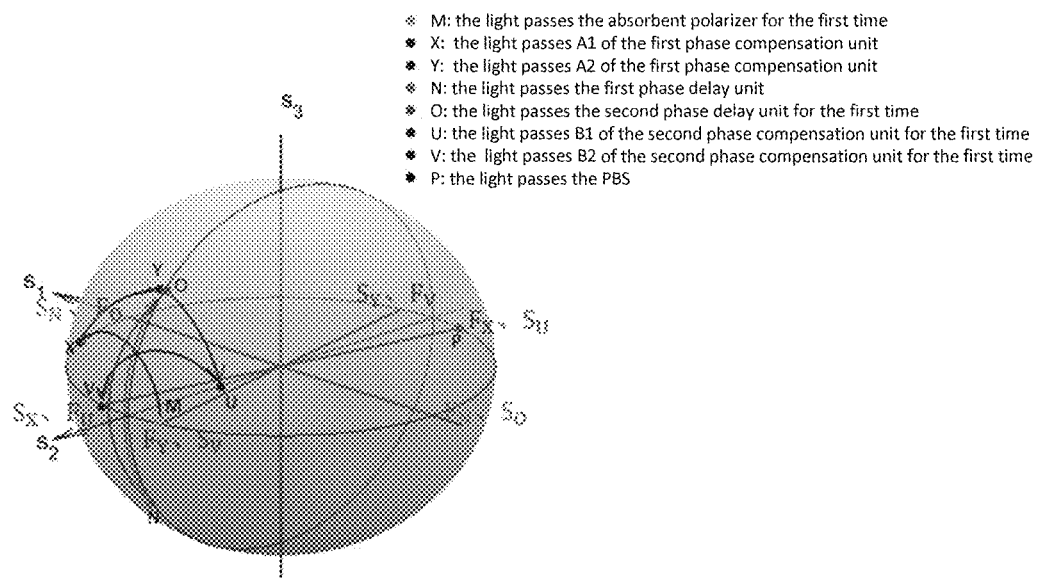
FIG. 10A shows the polarization state of the light beams in the optical module according to Example 3 of the present invention.

According to the variation in the polarization state of the light incident at θ=60, φ=45° in the structure of Example 3, as shown in FIG. 10A, it can be seen that the polarization state point V of the light that passes for the first time through the second phase compensation unit almost coincides with the point symmetrical with point P about the spherical center. Therefore, the light beam is almost completely reflected without any light leakage when entering the polarized beam splitter PBS for the first time.

Figure 10B:
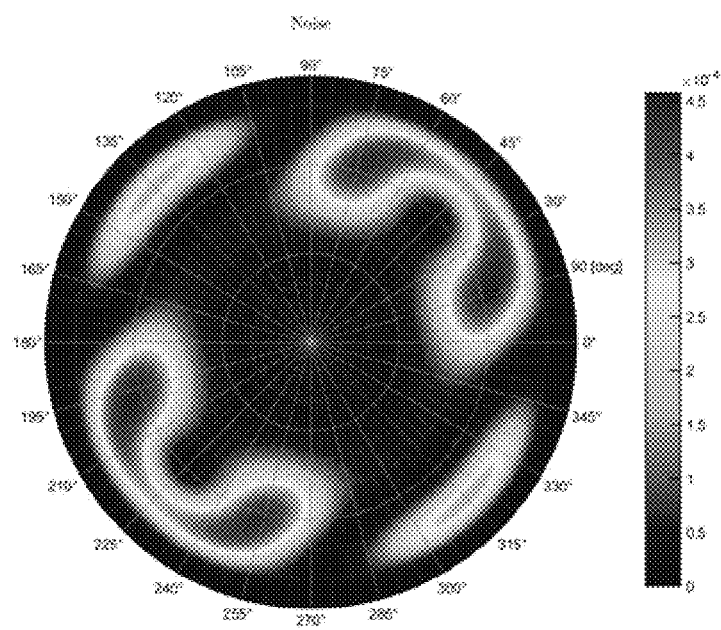
FIG. 10B shows the distribution of the intensity of the signal light and stray light at different incident angles of the light beams in the optical module according to Example 3 of the present invention.

The distribution of the intensity of the stray light according to the different incident angles of the light beams is as shown in FIG. 10B. As compared with FIG. 6D, this example greatly reduces the light leakage in a folded optical path, and the leakage intensity is reduced to 7% of the original.

From the aforesaid Examples 1-3, it can be found that the optical modules according to the examples of the present invention can reduce the occurrence of the light leakage in a folded optical path.

The present invention also relates to a near-eye display device, comprising a display screen; and an optical module 20, 30 or 40 as described above, which is disposed downstream of an optical path of the display screen. The near-eye display device is, for example, an augmented reality AR device, a virtual reality VR device, or a mixed reality MR device of other types.

Figure 11:
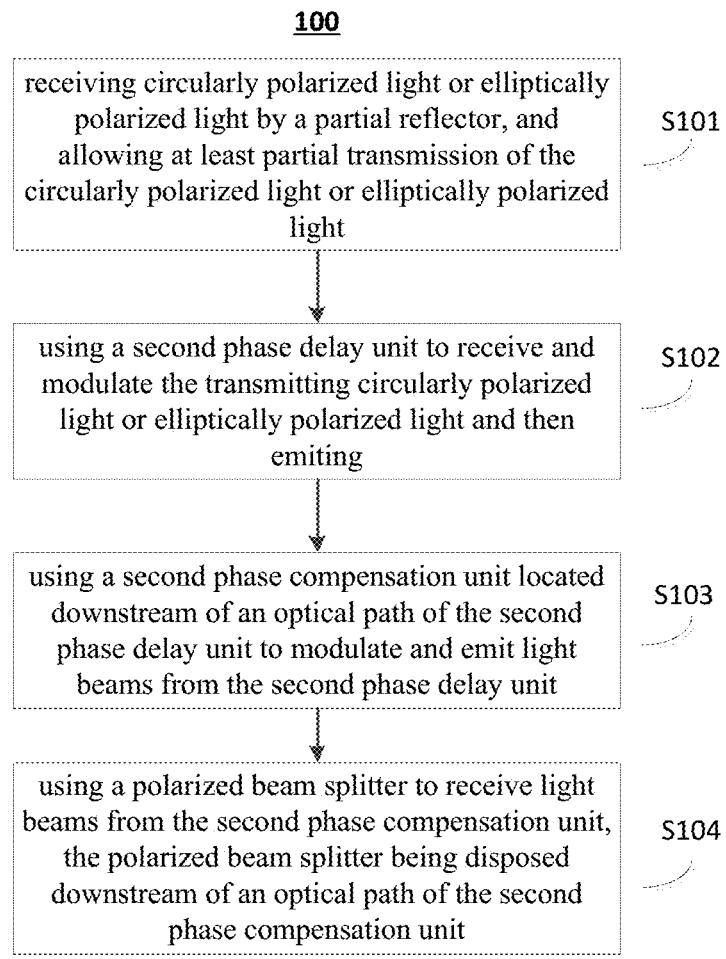
FIG. 11 shows a light projection method according to one example of the present invention.

FIG. 11 shows a light projection method 100 according to one example of the present invention, which will be described in detail below with reference to FIG. 11.

In step S101, receiving circularly polarized light or elliptically polarized light by a partial reflector (such as a partial-transmitting and partial-reflective layer), and allowing at least partial transmission of the circularly polarized light or elliptically polarized light;

In step S102: using a second phase delay unit to receive and modulate the transmitting circularly polarized light or elliptically polarized light and then emit the modulated circularly polarized light or elliptically polarized light;

In step S103: using a second phase compensation unit located downstream of an optical path of the second phase delay unit to modulate and emit light beams from the second phase delay unit;

In step S104: using a polarized beam splitter to receive light beams from the second phase compensation unit, the polarized beam splitter being disposed downstream of an optical path of the second phase compensation unit, and the polarized beam splitter having a light transmission axis, allowing transmission of part of the light beams having a polarization direction parallel to the light transmission axis of the polarized beam splitter, and reflecting the rest of the light beams back to the second phase delay plate, wherein an optical axis of the second phase compensation unit is located in a plane orthogonal to the light transmission axis of the polarized beam splitter, or in a plane orthogonal to a light reflection axis of the polarized beam splitter.

In accordance with one preferred example of the present invention, the second phase compensation unit is configured in such a manner as to modulate light beams initially incident at respective incident angles on the second phase compensation unit according to a polarization state distribution thereof, such that a polarization state of the light beams initially incident at respective incident angles on the second phase compensation unit after transmission through the second phase compensation unit meets the condition for being reflected by the polarized beam splitter.

In accordance with one preferred example of the present invention, the light projection method further comprises:

generating linearly polarized light by a polarizer; and using a first phase delay unit to receive the linearly polarized light from the polarizer, converting the same into circularly polarized light or elliptically polarized light, and emitting it onto the partial-transmitting and partial-reflective layer.

In accordance with one preferred example of the present invention, the light projection method further comprises:

using a first phase compensation unit located between the first phase delay unit and the polarizer to modulate the linearly polarized light from the polarizer and then make the same incident on the first phase delay unit, wherein an optical axis of the first phase compensation unit is located in a plane orthogonal to a light transmission axis of the polarizer, or in a plane perpendicular to a light absorption axis of the polarizer, wherein the first phase compensation unit is configured in such a manner as to modulate linearly polarized light incident thereon from the polarizer according to a polarization state distribution thereof, such that a polarization state of light beams initially incident on the polarized beam splitter meets the condition for being reflected by the polarized beam splitter.

In accordance with one preferred example of the present invention, the first phase delay unit and the second phase delay unit are both positive phase delay units or both negative phase delay units, and satisfy the following relation: $\alpha_1 = \alpha_2 = 45°$ or $135°$; or the first phase delay unit and the second phase delay unit, opposite in type, are respectively a positive phase delay unit or a negative phase delay unit, and satisfy the following relation: $\alpha_1 = -\alpha_2 = 45°$ or $135°$, wherein $\alpha_1$ is an angle through which the light transmission axis of the polarizer rotates counterclockwise to an optical axis of the first phase delay unit when observed against the optical path direction, and $\alpha_2$ is an angle through which the light transmission axis of the polarized beam splitter rotates counterclockwise to an optical axis of the second phase delay unit when observed against the optical path direction.

In accordance with one aspect of the present invention, the light projection method is implemented by the optical module 20 or 30 as described above.

Second Aspect

In the example of the first aspect of the present invention as described above, the optical module 10 comprises a lens (i.e., a first lens unit), and the optical module may also comprise a plurality of lens units, which will be described in detail below with reference to the figures.

Figure 12:
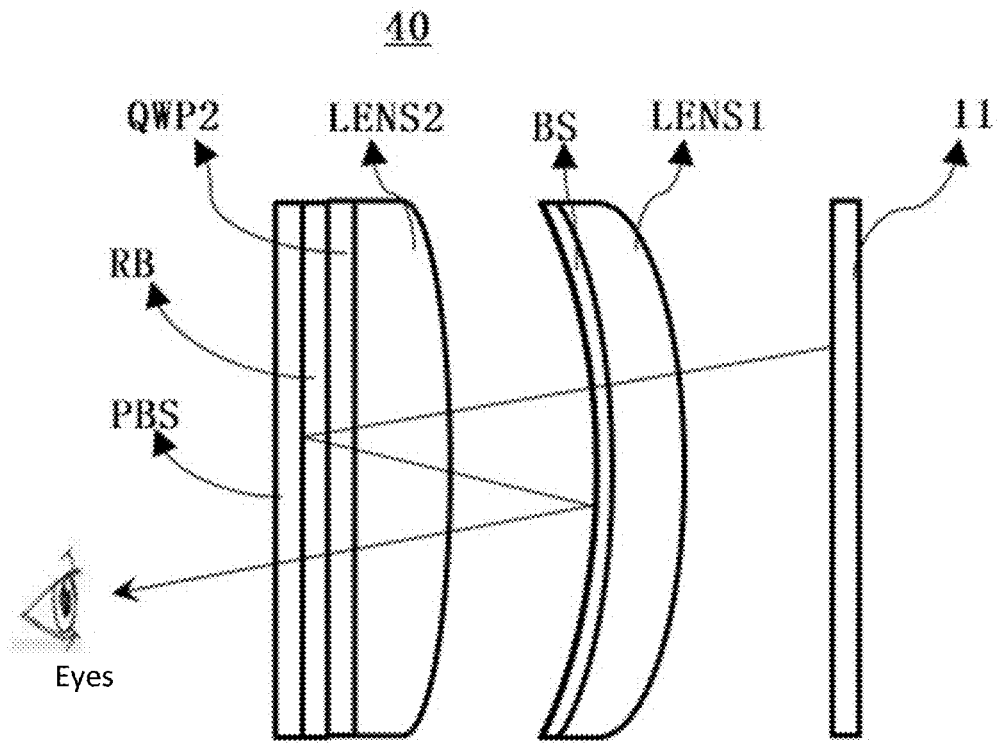
FIG. 12 shows an optical module according to a first example of the second aspect of the present invention.

FIG. 12 shows an optical module 40 according to one example of the present invention, which will be described in detail below with reference to FIG. 12. As shown in FIG. 12, the optical module 40 includes a first lens unit LENS1, a partial-transmitting and partial-reflective layer BS, a second lens unit LENS2, a second phase delay unit QWP2, a second phase compensation unit RB and a polarized beam splitter PBS in an optical path direction from the upstream of the optical path to the downstream (from an object side to an image side, i.e., from the right to the left in the figure). In FIG. 12, a display screen 11 is disposed upstream of the optical path of the optical module 40, and a light beam emitted by the display screen 11 is incident on the optical module 40, folded inside the optical module 40 and finally emergent to human eyes for imaging. The light emitted by the display screen 11 is preferably circularly polarized light or elliptically polarized light. The specific operation mode of the optical module 40 will be described in detail below.

As shown in FIG. 12, the partial-transmitting and partial-reflective layer BS is located downstream of an optical path of the first lens unit LENS1 and attached to a surface of the first lens unit LENS1. A person skilled in the art understands that the present invention is not limited to this because the partial-transmitting and partial-reflective layer BS may also be located upstream of the optical path of the first lens unit LENS1, or may also be disposed at a certain interval from the first lens unit LENS1, all of which are within the scope of the present invention.

Moreover, in the example illustrated by FIG. 12, the second phase delay unit QWP2, the second phase compensation unit RB and the polarized beam splitter PBS are successively stacked on a surface of the second lens unit LENS2, and these optical components may also be separated from each other, which will not be repeated here.

In the present invention, the first lens unit LENS1 and the second lens unit LENS2 are configured to image the image light incident on the first lens unit LENS1 to a user's eyes downstream of the second lens unit LENS2. The first lens unit LENS1 and the second lens unit LENS2 can image the content of the display screen 11 to human eyes. Additionally, it is preferred that the first lens unit LENS1 can regulate the diopter of the optical module. The first lens unit LENS1 and the second lens unit LENS2 may be composed of a single lens, or may be composed of a lens group, both of which are within the scope of the present invention.

Figure 13:
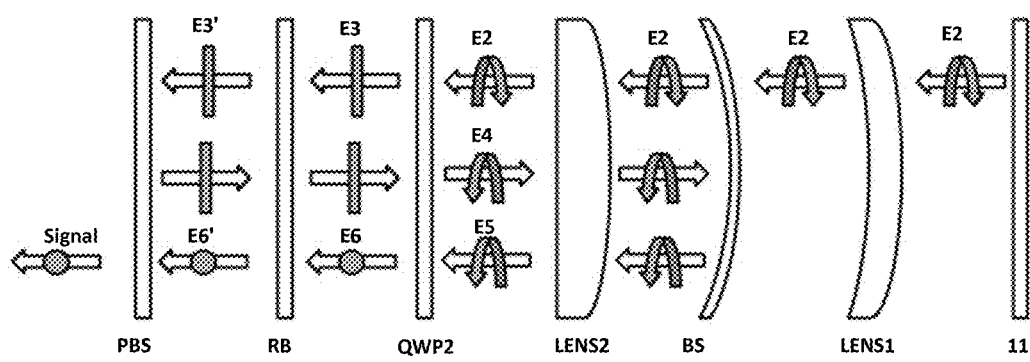
FIG. 13 is a schematic diagram illustrating an optical path of the optical module according to the first example of the second aspect of the present invention.

FIG. 13 shows the working process of the optical module 40 in FIG. 12, which will be described in detail below with reference to FIG. 13.

As shown in FIG. 13, the display screen 11 emits circularly polarized light or elliptically polarized light E2, which passes through the first lens unit LENS1 and is incident on the partial-transmitting and partial-reflective layer BS. The partial-transmitting and partial-reflective layer BS is located downstream of the optical path of the first lens unit LENS1, and receives the circularly polarized light or elliptically polarized light E2, allowing at least partial transmission of the circularly polarized light or elliptically polarized light E2. The present invention imposes no limitation on the specific transmissivity of the partial-transmitting and partial-reflective layer BS, which may be 50% or in other proportions. The partially transmitting light beam E2 then goes through the second lens unit LENS2 and is incident on the second phase delay unit QWP2. A person skilled in the art readily understands that the first lens unit LENS1, the partial-transmitting and partial-reflective layer BS, and the second lens unit LENS2 do not change the polarization state of the light beam. Therefore, any light beams upstream and downstream of the optical path of the first lens unit LENS1, the partial-transmitting and partial-reflective layer BS, and the second lens unit LENS2 are represented by E2.

The light beam E2, after going through the second phase delay unit QWP2, is modulated into linearly polarized light E3, and the linearly polarized light E3 is incident on the second phase compensation unit RB and is modulated into linearly polarized light E3'. The linearly polarized light E3' has a polarization direction perpendicular to the light transmission axis of the polarized beam splitter PBS, so it is reflected by the polarized beam splitter PBS and turnback takes place. Subsequently, the turnback light beam transmits through the second phase compensation unit RB and the second phase delay unit QWP2 (circularly polarized light or elliptically polarized light E4, different from the polarization of the light beam E2 emitted by the display screen 11, of which one is right-handed circularly (elliptically) polarized light, and the other is left-handed circularly (elliptically) polarized light), then is partially reflected by the partial-transmitting and partial-reflective layer BS after its passing through the second lens unit LENS2 (circularly polarized light or elliptically polarized light E5), goes again through the second phase delay unit QWP2 (linearly polarized light E6) and the second phase compensation unit RB (linearly polarized light E6'), and is incident again on the polarized beam splitter PBS. The polarized beam splitter PBS is disposed downstream of the optical path of the second phase delay unit QWP2, and the polarized beam splitter PBS has a light transmission axis $T_{PBS}$, allowing transmission of some of the light beams having a polarization direction parallel to the light transmission axis $T_{PBS}$, and reflecting the rest of the light beams back to the second phase delay unit QWP2. At this time, the polarized light E6' has a polarization direction parallel to the light transmission axis of the polarized beam splitter PBS, and thus can transmit through the polarized beam splitter PBS.

During the above turnback process in the optical path, the light beam reflected by the polarized beam splitter PBS transmits through the second phase compensation unit RB and the second phase delay unit QWP2, is partially reflected by the partial-transmitting and partial-reflective layer BS, and transmits again through the second phase delay unit QWP2 and the second phase compensation unit RB. A polarization direction of the turnback light beam that reaches the polarized beam splitter PBS is parallel to the light transmission axis of the polarized beam splitter PBS so as to enable the transmission to form a signal (light) for imaging in human eyes.

In the examples illustrated by FIGS. 12 and 13, a second phase compensation unit RB is added between the second phase delay unit QWP2 and the polarized beam splitter PBS so as to make the polarization state of the light beam E3' initially incident at respective incident angles on the polarized beam splitter PBS satisfy or as far as possible satisfy the condition for being reflected by the polarized beam splitter PBS, thereby greatly reducing the intensity of light leakage and stray light. In this manner, the intensity of the stray light can be reduced to 5% of that of the signal light, while the signal light is not be affected substantially. The dot or arrow on the arrow for denoting a light beam in FIG. 13 represents the corresponding polarization state of the light beam.

In accordance with one preferred example of the present invention, the optical axis of the second phase compensation unit RB is located in a plane orthogonal to the light transmission axis $T_{PBS}$ of the polarized beam splitter PBS, or in a plane orthogonal to a light reflection axis of the polarized beam splitter PBS. According to one example of the present invention, the second phase compensation unit RB is configured in such a manner as to modulate light beams initially incident at respective incident angles on second phase compensation unit RB according to a polarization state distribution thereof, such that a polarization state of the light beams initially incident at respective incident angles on the second phase compensation unit RB after transmission through the second phase compensation unit RB meets the condition for being reflected by the polarized beam splitter 16. A person skilled in the art readily understands that, in the present invention, although the second phase compensation unit RB makes the polarization state of the light beams initially incident at respective incident angles on the polarized beam splitter PBS satisfy the condition for being reflected by the polarized beam splitter PBS, this does not necessarily make the polarization state of the light beams initially incident on the polarized beam splitter PBS completely satisfy the condition for being reflected, as long as the polarization state of a larger proportion of the light beams meets the condition for being reflected (as compared with the circumstance where no phase compensation unit is provided).

Additionally, in the context of the present invention, λ represents a wavelength of incident light.

Table I below offers a combination of lens parameters of the optical module according to the first example of the present invention (wherein the upstream of the optical path is referred to as "front" and the downstream of the optical path is referred to as "rear").

TABLE I

|  | Radius of Curvature | Parameter Value |
| --- | --- | --- |
| First Lens Unit | Radius of Curvature of Front Surface | −1284 |
|  | Radius of Curvature of Rear Surface | −93 |
| Second Lens Unit | Radius of Curvature of Front Surface | −55 |
|  | Radius of Curvature of Rear Surface | Plane |

In addition, the second phase compensation unit RB may be formed in many configurations. In accordance with one preferred example of the present invention, the second phase compensation unit includes a phase delay plate A and a phase delay plate B superimposed in the optical path direction. Among them, the parameters of the phase delay plate A are as follows: no<ne; the optical axis direction being parallel to its plane and perpendicular to the light transmission axis of the polarized beam splitter PBS; and the retardance being 80 nm; and the parameters of the phase delay plate B are as follows: no>ne; the optical axis direction being parallel to its plane and parallel to the light transmission axis of the polarized beam splitter PBS; and the retardance being 80 nm.

FIGS. 14A and 14B show schematic diagrams of the circumstances of light leakage for comparison. According to the prior art, in the absence of a phase compensation unit, there will be serious light leakage in a large field of view (as shown in FIG. 14A); and according to the first example illustrated by FIGS. 12 and 13 of the present invention, a phase compensation unit is added, such that the light leakage can be reduced to 4.3% of the original (as shown in FIG. 14B).

FIG. 15 shows an optical module 40 according to the second example of the present invention. The difference from the example illustrated by FIG. 12 will be particularly described below, and the similarities will not be repeated.

As shown in FIG. 15, in the optical module 40 illustrated by the figure, the partial-transmitting and partial-reflective layer BS is located upstream of the optical path of the first lens unit LENS1 and attached to a surface upstream of the optical path of the first lens unit LENS1. In addition, the second lens unit LENS2 is located downstream of the optical path of the polarized beam splitter PBS, and a second polarizer POL2 is also disposed between the polarized beam splitter PBS and the second lens unit LENS2. By disposing the second polarizer POL2, the light leakage in the polarized beam splitter PBS can be further reduced.

Table II below offers a combination of lens parameters of the optical module according to the second example of the present invention (wherein the upstream of the optical path is referred to as "front" and the downstream of the optical path is referred to as "rear").

TABLE II

|  | Radius of Curvature | Parameter Value |
| --- | --- | --- |
| First Lens Unit | Radius of Curvature of Front Surface | −1000~−1500 |
|  | Radius of Curvature of Rear Surface | −70~−120 |
| Second Lens Unit | Radius of Curvature of Front Surface | Plane |
|  | Radius of Curvature of Rear Surface | −30~−70 |

The working mode of the optical module 40 of the example illustrated by FIG. 15 is basically the same as the one shown in FIG. 13, which will not be repeated here.

Figure 16:
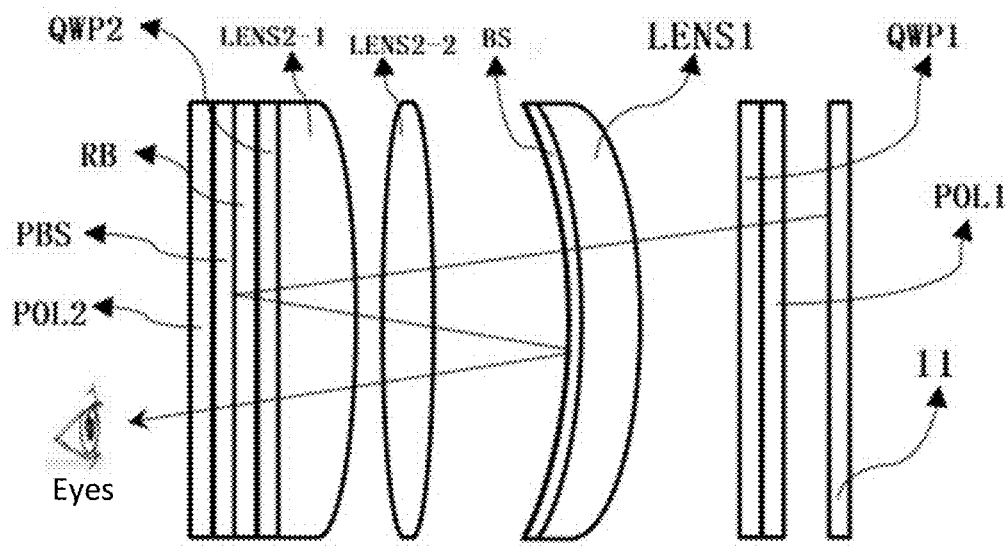
FIG. 16 shows an optical module according to a third example of the second aspect of the present invention.

FIG. 16 shows an optical module 40 according to a third example of the present invention. As shown in FIG. 16, the second lens unit LENS2 includes a sub-lens LENS2-1 and a sub-lens LENS2-2. In addition, the second lens unit LENS2 is located upstream of the optical path of the second phase delay unit QWP2 and downstream of the optical path of the partial-transmitting and partial-reflective layer BS. The optical module 40 in FIG. 16 further comprises a second polarizer POL2 located downstream of the optical path of the polarized beam splitter PBS. The optical module 40 also comprises a first polarizer POL1 and a first phase delay unit QWP1, located between the display screen 11 and the first lens unit LENS1. The first polarizer POL1 receives a light beam from the display screen 11 and emits linearly polarized light. The linearly polarized light that goes through the first phase delay unit QWP1 is modulated into circularly polarized light or elliptically polarized light E2 which is incident on the first lens unit LENS1.

Table III below offers a combination of lens parameters of the optical module according to the third example of the present invention (wherein the upstream of the optical path is referred to as "front" and the downstream of the optical path is referred to as "rear").

TABLE III

|  |  | Radius of Curvature | Parameter Value |
| --- | --- | --- | --- |
| First Lens Unit |  | Radius of Curvature of Front Surface | −100~−2000 |
|  |  | Radius of Curvature of Rear Surface | −100~−1000 |
| Second Lens Unit | LENS2-2 | Radius of Curvature of Front Surface | −50~700 |
|  |  | Radius of Curvature of Rear Surface | −50~700 |
|  | LENS2-1 | Radius of Curvature of Front Surface | −100~−1000 |
|  |  | Radius of Curvature of Rear Surface | Plane |

Figure 17:
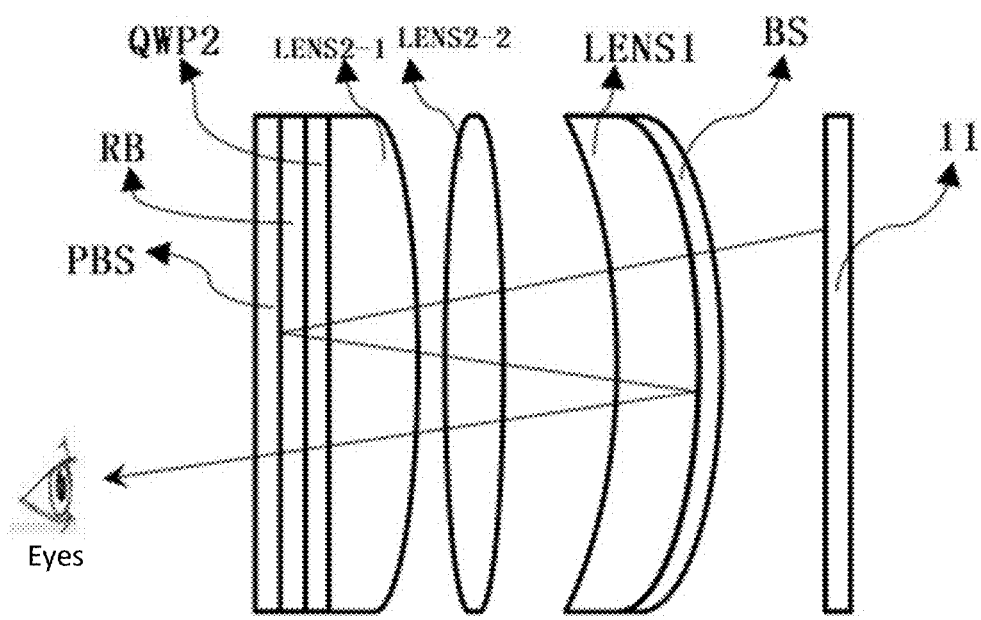
FIG. 17 shows an optical module according to a fourth example of the second aspect of the present invention.

FIG. 17 shows an optical module 40 according to a fourth example of the present invention, wherein the second lens unit LENS2 includes sub-lenses LENS2-1 and LENS2-2. As shown in FIG. 17, the optical module 40 successively comprises a partial-transmitting and partial-reflective layer BS, a first lens unit LENS1, a second lens unit LENS2 (sub-lenses LENS2-1 and LENS2-2), a second phase delay unit QWP2, a second phase compensation unit RB and a polarization splitter PBS in the optical path direction.

Table IV below offers a combination of lens parameters of the optical module according to the fourth example of the present invention (wherein the upstream of the optical path is referred to as "front" and the downstream of the optical path is referred to as "rear").

TABLE IV

|  |  | Radius of Curvature | Parameter Value |
| --- | --- | --- | --- |
| First Lens Unit |  | Radius of Curvature of Front Surface | −100~−1000 |
|  |  | Radius of Curvature of Rear Surface | 1000~2000 |
| Second Lens Unit | LENS2-2 | Radius of Curvature of Front Surface | −50~700 |
|  |  | Radius of Curvature of Rear Surface | −50~700 |
|  | LENS2-1 | Radius of Curvature of Front Surface | −100~−1000 |
|  |  | Radius of Curvature of Rear Surface | Plane |

In the aforesaid examples of FIGS. 12-17, the display screen 11 may also constitute a part of the optical module 40. Moreover, in the present invention, the position of the second lens unit LENS2 can be flexibly arranged as long as the second lens unit LENS2 is located downstream of the optical path of the partial-transmitting and partial-reflective layer BS.

In accordance with one preferred example of the present invention, the second phase delay unit QWP2 is configured to apply a phase delay of $n*\lambda+¾\lambda$ to the polarized component in the optical axis direction of the linearly polarized light incident thereon, or apply a phase delay of $n*\lambda+¼\lambda$, where n is an integer. Additionally, in an example comprising a first phase delay unit QWP1 (e.g., the example in FIG. 16), the first phase delay unit QWP1 is configured to apply a phase delay of $n*\lambda+¾\lambda$, or a phase delay of $n*\lambda+¼\lambda$ to a polarized component in the optical axis direction of the linearly polarized light incident thereon. In accordance with one preferred example of the present invention, the second phase delay unit QWP2 and the first phase delay unit QWP1 are both quarter wave plates.

Moreover, in a variant example of the present invention, the optical module 40 may also not comprise the first polarizer POL1. For example, the first polarizer POL1 may be integrated with a light source upstream of the optical path (e.g., the display screen 11). These are all within the protection scope of the present invention. In addition, the first polarizer POL1 and the first phase delay unit QWP1 may be integrated together in the light source (the display screen 11).

A person skilled in the art readily understands that the phase compensation amount of the second phase compensation unit RB is not limited to some specific value, as long as it can help to improve the reflected proportion of the light beams when being initially incident on the polarized beam splitter PBS. In addition, the second phase compensation unit RB may be composed of a single phase compensation plate, or may comprise a plurality of phase compensation plates, and the present invention does not limit the specific number. In the specific optical path design, upon the given wavelength, the given optical parameters of the first polarizer Po11, the first phase delay unit QWP1, the second phase delay unit QWP2 and the PBS, as well as the given orientation parameters of the above devices, the second phase compensation unit RB can be designed as long as the reflected proportion of the light beams when being initially incident on the polarized beam splitter PBS can be increased relative to the case where the second phase compensation unit RB is not provided. The specific calculation method will not be repeated here.

Further preferably, light leakage can be further eliminated or reduced by setting the type of the first phase delay unit QWP1 and the angle relation of the optical axis. In order to clearly describe the present invention, it is necessary to distinguish the "positive" and "negative" types of the first phase delay unit QWP1 and the second phase delay unit QWP2. "Positive" and "negative" are defined as follows:

A positive phase delay unit refers to the one that applies a phase delay of $N*\lambda+\frac{1}{4}\lambda$ to a polarized component of the incident light beams along the optical axis, where N is an integer; and A negative phase delay unit refers to the one that applies a phase delay of $M*\lambda+\frac{3}{4}\lambda$ to a polarized component of the incident light beams along the optical axis, where M is an integer.

In accordance with one example of the present invention, the light leakage phenomenon can be further alleviated when the following relation is satisfied: the first phase delay unit QWP1 and the second phase delay unit QWP2 are both positive phase delay units or both negative phase delay units, and satisfy the following relation: $\alpha_1=\alpha_2=45°$ or $135°$; or the first phase delay unit and the second phase delay unit, opposite in type, are respectively a positive phase delay unit or a negative phase delay unit, and satisfy the following relation: $\alpha_1=-\alpha_2=45°$ or $135°$, wherein $\alpha_1$ and $\alpha_2$ are as defined in the first aspect of the present invention. According to the relation between angles $\alpha_1$ and $\alpha_2$ as described above, a person skilled in the art readily understands that the equations listed above allow an error within the engineering acceptable range. For example, when any difference between these two and a target angle is within plus or minus 5 degrees, the above equations can be considered to be satisfied. Taking the target angle of $\alpha_1=\alpha_2=45°$ as an example, the case of $\alpha_1=40°$ and $\alpha_2=50°$ in practice can be considered to satisfy $\alpha_1=\alpha_2=45°$.

When the optical module comprises the first polarizer POL1, the light transmission axis of the first polarizer Po11 is parallel to the polarization direction D1 of the linearly polarized light incident on the first phase delay unit QWP1 under normal incidence, so $\alpha_1$ is an angle through which the light transmission axis of the first polarizer rotates counter-clockwise to the optical axis $T_{QWP1}$ of the first phase delay unit QWP1 when observed against the optical path direction (i.e., observed from the left to the right in the figure).

Moreover, the present invention, for the sake of clarity, distinguishes a light beam incident initially (first) on the polarized beam splitter PBS from a light beam incident again on the polarized beam splitter PBS. Referring to FIG. 13, the light beam E3' is called a light beam incident initially (first) on the polarized beam splitter PBS, and the light beam E3 is called a light beam incident initially (first) on the second phase compensation unit RB; while the light beam E6' is called a light beam incident again on the polarized beam splitter PBS, and the light beam E6 is called a light beam incident again on the second phase compensation unit RB; meanwhile, the light beams E4, E5, E6 and E6' all can be referred to as a turnback light beam. The optical path structure in other drawings may also be appreciated in the same way, and the relevant description will not be repeated here.

As compared with the solution about a folded optical path in the prior art, the technical solution of the present invention can be employed to achieve that the light beams incident initially on the polarized beam splitter PBS transmit in a smaller proportion through the polarized beam splitter PBS, so the noise (stray light) as produced becomes less. Most of the light beams are reflected to form turnback light beams. When they are incident again on the polarized beam splitter, their polarization direction is parallel to or as far as possible parallel to the light transmission axis $T_{PBS}$ of the polarized beam splitter, so they can transmit and form a signal (light). In addition, as compared with the technical solution with a single lens unit, a plurality of lens units are disposed in the present application, which can not only enhance the imaging effect in human eyes, for example improving the picture definition or enlarging the image field angle, but also increase the focal length of the imaging module to make the module lighter and thinner, and further regulate the diopter of the optical module to meet the demands for glasses-free observation from various myopic groups.

The present invention also relates to a near-eye display device, comprising a display screen and an optical module as described above, the optical module being arranged downstream of an optical path of the display screen.

Free combination can be conducted among the examples of the first aspect and the second aspect of the present invention if there is no conflict or contradiction.

Last but not least, it should be noted that the contents described above are just preferred examples of the present invention, and are not used to limit the present invention. Although the detailed description of the present invention has been provided with reference to the foregoing examples, those skilled in the art still may make modifications to the technical solution as recited in each of the foregoing examples, or conduct equivalent replacement of some technical features therein. Any modification, equivalent replacement, or improvement, if only falling into the spirit and principles as stated herein, should be included in the protection scope of the present invention.

We claim:
1. An optical module, comprising:
   a partial reflector, receiving circularly polarized light or elliptically polarized light, wherein part of the circularly polarized light or elliptically polarized light is reflected and part of the circularly polarized light or elliptically polarized light transmits through the partial reflector;
   a second phase delay unit, located downstream of an optical path of the partial reflector so as to receive and modulate the transmitting circularly polarized light or elliptically polarized light before emission; and
   a polarized beam splitter, disposed downstream of an optical path of the second phase delay unit, the polarized beam splitter having a light transmission axis,
   wherein the optical module further comprises a second phase compensation unit located between the second phase delay unit and the polarized beam splitter, and wherein an optical axis of the second phase compensation unit is located in a plane orthogonal to the light transmission axis of the polarized beam splitter, or in a plane orthogonal to a light reflection axis of the polarized beam splitter.

2. The optical module according to claim 1, further comprising a polarizer and a first phase delay unit, located upstream of the optical path of the partial reflector, the polarizer being configured to generate linearly polarized light, and the first phase delay unit is configured to receive the linearly polarized light from the polarizer, modulate the same into the circularly polarized light or elliptically polarized light before emitting to the partial reflector.

3. The optical module according to claim 1, wherein the second phase compensation unit is configured in such a manner as to modulate light beams initially incident at respective incident angles on the second phase compensation unit according to a polarization state distribution thereof, such that a polarization state of the light beams initially incident at respective incident angles on the second phase compensation unit after transmission through the second phase compensation unit meets the condition for being reflected by the polarized beam splitter.

4. The optical module according to claim 2, wherein the first phase delay unit is configured to apply a phase delay of $n*\lambda+3/4\lambda$, or a phase delay of $n*\lambda+1/4\lambda$ to a polarized component in the optical axis direction of the linearly polarized light incident thereon; and the second phase delay unit is configured to apply a phase delay of $n*\lambda+3/4\lambda$, or a phase delay of $n*\lambda+1/4\lambda$ to a polarized component in the optical axis direction of the linearly polarized light incident thereon, where n is an integer.

5. The optical module according to claim 1, wherein light beams reflected by the polarized beam splitter transmit through the second phase compensation unit and the second phase delay unit, are partially reflected by the partial reflector, and transmit again through the second phase delay unit and the second phase compensation unit, a polarization direction of turnback light beams that reach the polarized beam splitter being parallel to the light transmission axis of the polarized beam splitter.

6. The optical module according to claim 2, wherein the first phase delay unit and the second phase delay unit are both positive phase delay units or both negative phase delay units, and satisfy the following relation:

$$\alpha_1=\alpha_2=45° \text{ or } 135°$$

$\alpha_1$ is an angle through which a light transmission axis of the polarizer rotates counterclockwise to an optical axis of the first phase delay unit when observed against the optical path direction, and $\alpha_2$ is an angle through which the light transmission axis of the polarized beam splitter rotates counterclockwise to an optical axis of the second phase delay unit when observed against the optical path direction.

7. The optical module according to claim 2, wherein the first phase delay unit and the second phase delay unit, opposite in type, are respectively a positive phase delay unit or a negative phase delay unit, and satisfy the following relation:

$$\alpha_1=-\alpha_2=45° \text{ or } 135°$$

$\alpha_1$ is an angle through which the light transmission axis of the polarizer rotates counterclockwise to the optical axis of the first phase delay unit when observed against the optical path direction, and $\alpha_2$ is an angle through which the light transmitting axis of the polarized beam splitter rotates counterclockwise to the optical axis of the second phase delay unit when observed against the optical path direction.

8. The optical module according to claim 1, wherein the second phase compensation unit is configured in such a manner as to modulate light beams initially incident at respective incident angles on the second phase compensation unit according to a polarization state distribution thereof, such that a polarization state of the light beams initially incident at respective incident angles on the second phase compensation unit after transmission through the second phase compensation unit meets the condition for being reflected by the polarized beam splitter.

9. The optical module according to claim 2, further comprising a first phase compensation unit located between the first phase delay unit and the polarizer.

10. The optical module according to claim 9, wherein an optical axis of the first phase compensation unit is located in a plane orthogonal to the light transmission axis of the polarizer, or in a plane orthogonal to a light absorption axis of the polarizer, and wherein the first phase compensation unit is configured in such a manner as to modulate linearly polarized light incident thereon from the polarizer according to a polarization state distribution thereof, such that a polarization state of light beams initially incident on the polarized beam splitter meets the condition for being reflected by the polarized beam splitter.

11. The optical module according to claim 1, further comprising a second polarizer located downstream of the polarized beam splitter, wherein the partial reflector is a partial-transmitting and partial-reflective layer, the optical module further comprises a first lens unit, disposed adjacent to the partial-transmitting and partial-reflective layer, and located upstream or downstream of the optical path of the partial-transmitting and partial-reflective layer, the partial-transmitting and partial-reflective layer being attached to a surface of the first lens unit.

12. The optical module according to claim 11, further comprising a second lens unit, located downstream of the optical path of the partial-transmitting and partial-reflective layer.

13. The optical module according to claim 12, wherein the second lens unit is located downstream of the optical path of the polarized beam splitter, or located upstream of the optical path of the second phase delay unit.

14. The optical module according to claim 12, wherein the first lens unit and the second lens unit are configured to be capable of imaging image light incident on the first lens unit to a user's eyes downstream of the second lens unit.

15. A near-eye display device, comprising:
a display screen; and
an optical module located downstream of an optical path of the display screen, the optical module comprising:
- a partial reflector, receiving circularly polarized light or elliptically polarized light, wherein part of the circularly polarized light or elliptically polarized light is reflected and part of the circularly polarized light or elliptically polarized light transmits through the partial reflector;
- a second phase delay unit, located downstream of an optical path of the partial reflector so as to receive and modulate the transmitting circularly polarized light or elliptically polarized light before emission; and
- a polarized beam splitter, disposed downstream of an optical path of the second phase delay unit, the polarized beam splitter having a light transmission axis, wherein the optical module further comprises a second phase compensation unit located between the second phase delay unit and the polarized beam splitter, and wherein an optical axis of the second phase compensation unit is located in a plane orthogonal to the light transmission axis of the polarized beam splitter, or in a plane orthogonal to a light reflection axis of the polarized beam splitter.

16. A light projection method, comprising:
S101: receiving circularly polarized light or elliptically polarized light by a partial reflector, and allowing at least partial transmission of the circularly polarized light or elliptically polarized light;
S102: receiving the transmitting circularly polarized light or elliptically polarized light by a second phase delay unit and modulating the same before emission from the second phase delay unit;
S103: modulating light beams from the second phase delay unit by a second phase compensation unit located downstream of an optical path of the second phase delay unit before emission from the second phase compensation unit; and
S104: receiving light beams from the second phase compensation unit by a polarized beam splitter, the polarized beam splitter being disposed downstream of an optical path of the second phase compensation unit, and the polarized beam splitter having a light transmission axis, allowing transmission of part of the light beams having a polarization direction parallel to the light transmission axis of the polarized beam splitter, and reflecting the rest of the light beams back to the second phase delay unit, wherein an optical axis of the second phase compensation unit is located in a plane orthogonal to the light transmission axis of the polarized beam splitter, or in a plane orthogonal to a light reflection axis of the polarized beam splitter.

17. The light projection method according to claim 16, wherein the second phase compensation unit is configured in such a manner as to modulate light beams initially incident at respective incident angles on the second phase compensation unit according to a polarization state distribution thereof, such that a polarization state of the light beams initially incident at respective incident angles on the second phase compensation unit after transmission through the second phase compensation unit meets the condition for being reflected by the polarized beam splitter.

18. The light projection method according to claim 16, further comprising:
generating linearly polarized light by a polarizer; and
using a first phase delay unit to receive the linearly polarized light from the polarizer, converting the same into the circularly polarized light or elliptically polarized light, and emitting the same onto the partial reflector.

19. The light projection method according to claim 16, further comprising:
using a first phase compensation unit located between the first phase delay unit and the polarizer to modulate the linearly polarized light from the polarizer and then emitting onto the first phase delay unit, wherein an optical axis of the first phase compensation unit is located in a plane orthogonal to a light transmission axis of the polarizer, or in a plane perpendicular to a light absorption axis of the polarizer, wherein the first phase compensation unit is configured in such a manner as to modulate linearly polarized light incident thereon from the polarizer according to a polarization state distribution thereof, such that a polarization state of light beams initially incident on the polarized beam splitter meets the condition for being reflected by the polarized beam splitter.

20. The light projection method according to claim 16, wherein the first phase delay unit and the second phase delay unit are both positive phase delay units or both negative phase delay units, and satisfy the following relation: $\alpha_1=\alpha_2=45°$ or $135°$; or the first phase delay unit and the second phase delay unit, opposite in type, are respectively a positive phase delay unit or a negative phase delay unit, and satisfy the following relation: $\alpha_1=-\alpha_2=45°$ or $135°$,
wherein $\alpha_1$ is an angle through which the light transmission axis of the polarizer rotates counterclockwise to an optical axis of the first phase delay unit when observed against the optical path direction, and $\alpha_2$ is an angle through which the light transmission axis of the polarized beam splitter rotates counterclockwise to the optical axis of the second phase delay unit when observed against the optical path direction.

* * * * *